US008248970B2

(12) United States Patent
Abramov et al.

(10) Patent No.: US 8,248,970 B2
(45) Date of Patent: Aug. 21, 2012

(54) OPTIMIZED DIRECTIONAL MIMO ANTENNA SYSTEM

(75) Inventors: Oleg Jurievich Abramov, St. Petersburg (RU); Pertti Visuri, San Diego, CA (US); Randy Salo, San Diego, CA (US); Xiao Ping Yang, San Diego, CA (US)

(73) Assignee: Airgain, Inc., Carlsbad, CA (US)

( * ) Notice: Subject to any disclaimer, the term of this patent is extended or adjusted under 35 U.S.C. 154(b) by 969 days.

(21) Appl. No.: 11/960,370

(22) Filed: Dec. 19, 2007

(65) Prior Publication Data
US 2008/0152030 A1 Jun. 26, 2008

Related U.S. Application Data

(60) Provisional application No. 60/870,818, filed on Dec. 19, 2006.

(51) Int. Cl.
*H04L 12/16* (2006.01)
*H04M 1/00* (2006.01)
(52) U.S. Cl. ..................... 370/260; 455/562.1
(58) Field of Classification Search .................. None
See application file for complete search history.

(56) References Cited

U.S. PATENT DOCUMENTS

| | | | |
|---|---|---|---|
| 2003/0048770 A1* | 3/2003 | Proctor, Jr. | 370/349 |
| 2005/0113120 A1* | 5/2005 | Rappaport et al. | 455/500 |
| 2005/0197162 A1* | 9/2005 | Fujishima et al. | 455/562.1 |
| 2006/0280116 A1* | 12/2006 | Ji et al. | 370/210 |
| 2007/0002722 A1* | 1/2007 | Palaskas et al. | 370/201 |
| 2007/0066361 A1* | 3/2007 | Knudsen et al. | 455/562.1 |
| 2007/0238480 A1* | 10/2007 | Lin et al. | 455/522 |
| 2008/0112363 A1* | 5/2008 | Rahman et al. | 370/331 |
| 2008/0293371 A1* | 11/2008 | Kishigami et al. | 455/278.1 |
| 2010/0061475 A1* | 3/2010 | Mo et al. | 375/261 |
| 2010/0066634 A1* | 3/2010 | Derneryd et al. | 343/893 |

FOREIGN PATENT DOCUMENTS

| | | |
|---|---|---|
| WO | 0173971 A2 | 10/2001 |
| WO | 2004040692 A1 | 5/2004 |

OTHER PUBLICATIONS

International Search Report/Written Opinion issued in PCT/US2007/088183 on May 7, 2008.

* cited by examiner

*Primary Examiner* — John Blanton
(74) *Attorney, Agent, or Firm* — Clause Eight IPS; Michael Catania

(57) ABSTRACT

A wireless communication device with a plurality of radios and a plurality of configurable antenna systems. Determining a plurality of transmit and receive signal quality metrics for connections between the wireless communication device and a plurality of stations for a plurality of radios and configurable antenna systems in a plurality of configurations. Determining a connection matrix that includes the transmit and receive signal quality. Selecting antenna configurations for the configurable antennas using the connection matrix.

23 Claims, 14 Drawing Sheets

OPTIMIZED DIRECTIONAL MIMO ANTENNA SYSTEM

RELATED APPLICATIONS

This application claims the benefit of U.S. Provisional Patent Application Ser. No. 60/870,818, filed Dec. 19, 2006, entitled "Optimized Directional MIMO Antenna System" which is incorporated herein by reference in its entirety.

BACKGROUND

1. Field

This invention relates generally to antenna systems, and more particularly, to optimized directional antenna systems.

2. Background

Wireless communications systems can facilitate two-way communications between a plurality of customers or stations in a fixed or variable network infrastructure. The wireless communication systems provide communication channels between the stations and their respective base stations or access points in order to connect a station's unit end-user with a fixed-network infrastructure (usually a wire-line system). Standards have been adopted and proposed for certain types of wireless communication systems. For example, the IEEE 802.11 standard defines certain operational aspects of a wireless communication system as does the proposed IEEE 802.16 standard.

SUMMARY

In one embodiment, a method of operating a wireless communication device with a plurality of radios and a plurality of configurable antenna systems includes determining a plurality of transmit and receive signal quality metrics for connections between the wireless communication device and a plurality of stations for a first of the plurality of radios with a first configurable antenna system in a plurality of configurations. Determining a plurality of transmit and receive signal quality metrics for connections between the wireless communication device and the plurality of stations for a second of the plurality of radios with a second configurable antenna system in a plurality of configurations. Determining a connection matrix including the transmit and receive signal quality metrics for the first and second radios and the plurality of configurations of the first and second configurable antennas. Selecting an antenna configuration for the first and second antenna configurations using the connection matrix.

In one embodiment, the first and second radios can transmit and receive independent data streams to a station. In another embodiment, the first and second radios can transmit the same data stream to a station. In still another embodiment, the first radio can transmit a first data stream to a first station and the second radio transmits a second data stream to a second station simultaneously. In yet another embodiment, the first radio can transmit data to a first station and the second radio receives data for the first station.

The first and second configurable antenna systems can be configured when the wireless communication device is transmitting, or not transmitting. Determining the signal quality metric can include sending a polling request.

In one embodiment, the wireless communication device repeats determining the plurality of transmit and receive signal quality metrics for connections between the wireless communication device and the plurality of stations for the first of the plurality of radios with the first configurable antenna system in the plurality of configurations Repeating determining the plurality of transmit and receive signal quality metrics for connections between the wireless communication device and the plurality of stations for the second of the plurality of radios with the second configurable antenna system in the plurality of configurations. And updates the connection matrix. This repeating, repeating, and updating can be performed at desired intervals, or when it is determined that the signal metrics have changed more that a predetermined amount.

In another embodiment, a method of operating a wireless device with a plurality of radios and a plurality of antennas, includes determining a signal quality metric for a first radio with a first antenna. Determining a signal quality metric for a second radio with a second antenna. Selecting an overall antenna gain for the wireless communication device by allocating different weights to signals transmitted and received by the first and second radio.

In one embodiment, the first and second antenna are configurable. In another embodiment, the first and second antennas have a predetermined configuration. The predetermined configuration can include a predetermined directional gain pattern. The predetermined direction gain pattern for the first and second antennas can cover different directions.

In one embodiment, allocating different weights include applying maximum ratio combining to signals received by the radios, or applying weights based on signal quality to signals transmitted by the radios, or other techniques for allocating weights.

In one embodiment, the wireless device is an access point. In another embodiment, wireless device is a station.

In one embodiment, a method of operating a station with a plurality of radios and a plurality of configurable antenna systems includes determining a plurality of transmit and receive signal quality metrics for a connection between the station and an access point for a first radio in the station with a first configurable antenna system in a plurality of configurations. Determining a plurality of transmit and receive signal quality metrics for the connection between the station and the access point for a second radio in the station with a second configurable antenna system in a plurality of configurations. Determining a connection matrix including the transmission and receive signal quality metrics for the first and second radios and the plurality of configurations of the first and second configurable antennas. Selecting an antenna configuration for the first and second antenna configurations using the connection matrix.

In one embodiment, the first and second radios transmit and receive independent data streams to the access point. In another embodiment, the first and second radios transmit the same data stream to the access point. Also, determining a transmission signal quality metric comprises receiving a polling request.

In one embodiment, an access point includes a plurality of radios and a plurality of configurable antenna systems. The access point also includes a processor that determines a plurality of transmit and receive signal quality metrics for connections between the wireless communication device and a plurality of stations for a first of the plurality of radios with a first configurable antenna system in a plurality of configurations. The processor determines a plurality of transmit and receive signal quality metrics for connections between the wireless communication device and the plurality of stations for a second of the plurality of radios with a second configurable antenna system in a plurality of configurations. The processor determines a connection matrix that includes the transmit and receive signal quality metrics for the first and second radios and the plurality of configurations of the first and second configurable antennas. A memory stores the connection matrix. An antenna control module that selects an antenna configuration for the first and second antenna configurations based on the connection matrix.

In one embodiment, a station in a wireless network includes a plurality of radios and a plurality of configurable antenna systems. The station also includes a processor that determines a plurality of transmit and receive signal quality metrics for a connection between the station and an access point for a first radio in the station with a first configurable antenna system in a plurality of configurations. The processor determines a plurality of transmit and receive signal quality metrics for the connection between the station and the access point for a second radio in the station with a second configurable antenna system in a plurality of configurations. The processor determines a connection matrix including the transmission and receive signal quality metrics for the first and second radios and the plurality of configurations of the first and second configurable antennas. An antenna control module that selects an antenna configuration for the first and second antenna configurations using the connection matrix.

Other features and advantages of the present invention should be apparent after reviewing the following detailed description and accompanying drawings which illustrate, by way of example, aspects of the invention.

BRIEF DESCRIPTION OF THE DRAWINGS

Aspects, advantages and details of the present invention, both as to its structure and operation, may be gleaned in part by a study of the accompanying drawings, in which like reference numerals refer to like parts. The drawings are not necessarily to scale, emphasis instead being placed upon illustrating the principles of the invention.

DETAILED DESCRIPTION OF THE EMBODIMENTS

Certain embodiments as disclosed herein provide for methods and systems for communication over a wireless air interface. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
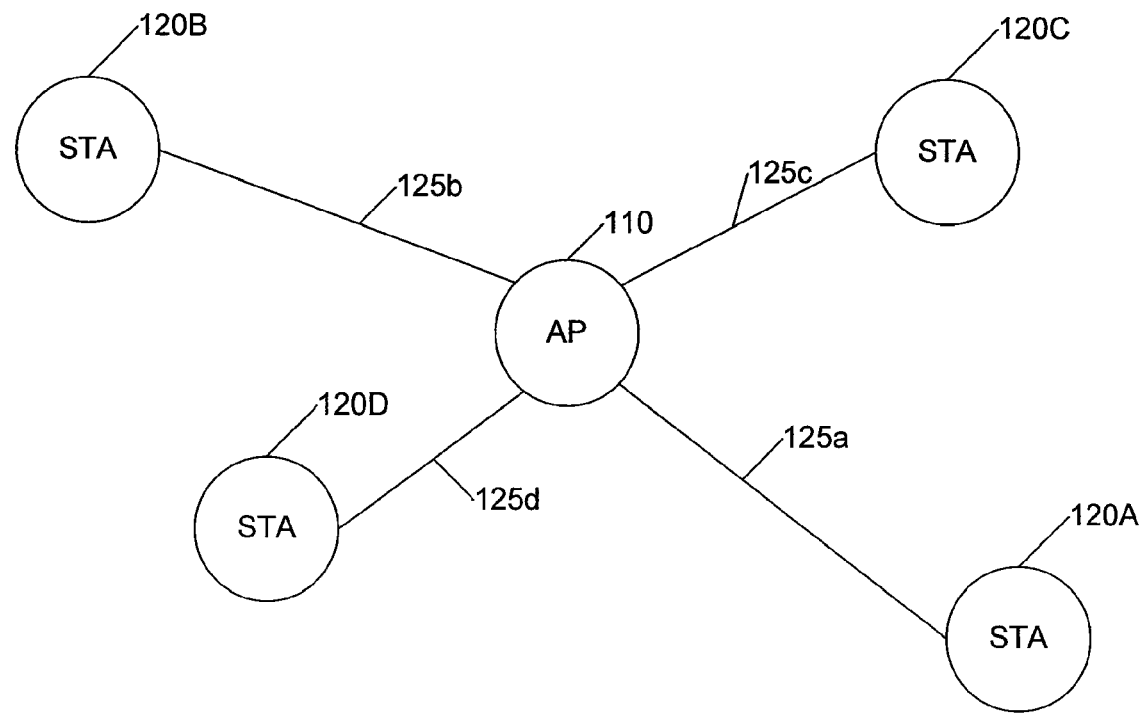
FIG. 1 is a block diagram of a wireless network.

FIG. 1 is a block diagram of a wireless network. The network includes a wireless access point (AP) 110. The wireless access point can be, for example, a wireless router, a cellular telephone base station, or other type of wireless communication device. The access point 110 is typically in communication with a back haul connection. For example, it can be in communication with a digital subscriber line (DSL). The access point can include more than one radio transmitter and more than one radio receiver. In general, an access point has the capability to communicate with more than one other device. The access point 110 can employ omni-directional antennas, directional antennas, or configurable antenna systems such as direction-agile antennas.

In one embodiment, the access point 110 includes a configurable antenna system which can be selectively configured to create different antenna gain patterns (antenna patterns) and/or polarizations. For example, the configurable antenna system can include antennas which can be configured to a discrete number of antenna patterns for each of the radio transmitters and receivers in the access point. Alternatively, the configurable antenna system can be configured to transmit and/or receive in different polarizations. In one embodiment the configurable antenna system can be configured to a discrete number of antenna patterns for each of the radio transmitters and receivers in the access point and to different polarizations. An antenna configuration can include an antenna gain pattern and a polarization. In one embodiment the configurable antenna system includes one or more directional antenna systems which allows the access point to direct or steer the gain of the antenna system (for both transmitting and receiving) in more than one direction or pattern for each of the radio transmitters and receivers. Such types of antenna systems are sometimes referred to as direction-agile antennas. An examples of such an antenna system which can be used with the methods and systems described herein is described in U.S. application Ser. No. 11/104,291, titled SWITCHED MULTI-BEAM ANTENNA, filed Apr. 12, 2005, and U.S. application Ser. No. 11/209,352, titled DIRECTIONAL ANTENNA SYSTEM WITH MULTI-USE ELEMENTS filed Aug. 22, 2005, both of which are hereby incorporated by reference. Alternatively, the access point can include a single radio transceiver in communication with a single directional antenna system.

The wireless network also includes associated clients or stations (STA) 120A-D. Only four stations are depicted in FIG. 1 for ease of description. However, more or fewer stations can be utilized. Each of the stations 120A-D includes one or more antennas for transmitting and receiving wireless signals with the access point 110 via a communication link 125 a-d. Though each of the communication links is depicted as a single line, it should be understood that the links can comprise multiple signal paths, multiple frequencies and can be implemented using multiple radios. The stations 120A-D can employ omnidirectional antennas, directional antennas, or configurable antenna systems such as direction-agile antennas. The systems and methods described herein can be applied to the access point 110 and the stations 120A-D.

The systems and methods described herein can be applied to systems wherein during any one period of time, the access point 110 can either transmit a wireless signal or receive a wireless signal. However, the systems and methods can also be applied to systems that permit simultaneous transmission and reception of wireless signals by the access point 110 and/or the stations 120A-D. For example, the systems and methods described herein can be applied to systems having multiple simultaneous transmission and reception paths. For example, the systems and methods can be applied to MIMO (multiple-in, multiple-out) systems. MIMO systems utilize multiplexing and other techniques of combining signals to increase wireless bandwidth and range. In one embodiment MIMO systems send information out over two or more antennas and the information is received via multiple antennas as well. MIMO systems use the additional pathways to transmit more information and then recombine the signal on the receiving end.

Figure 2:
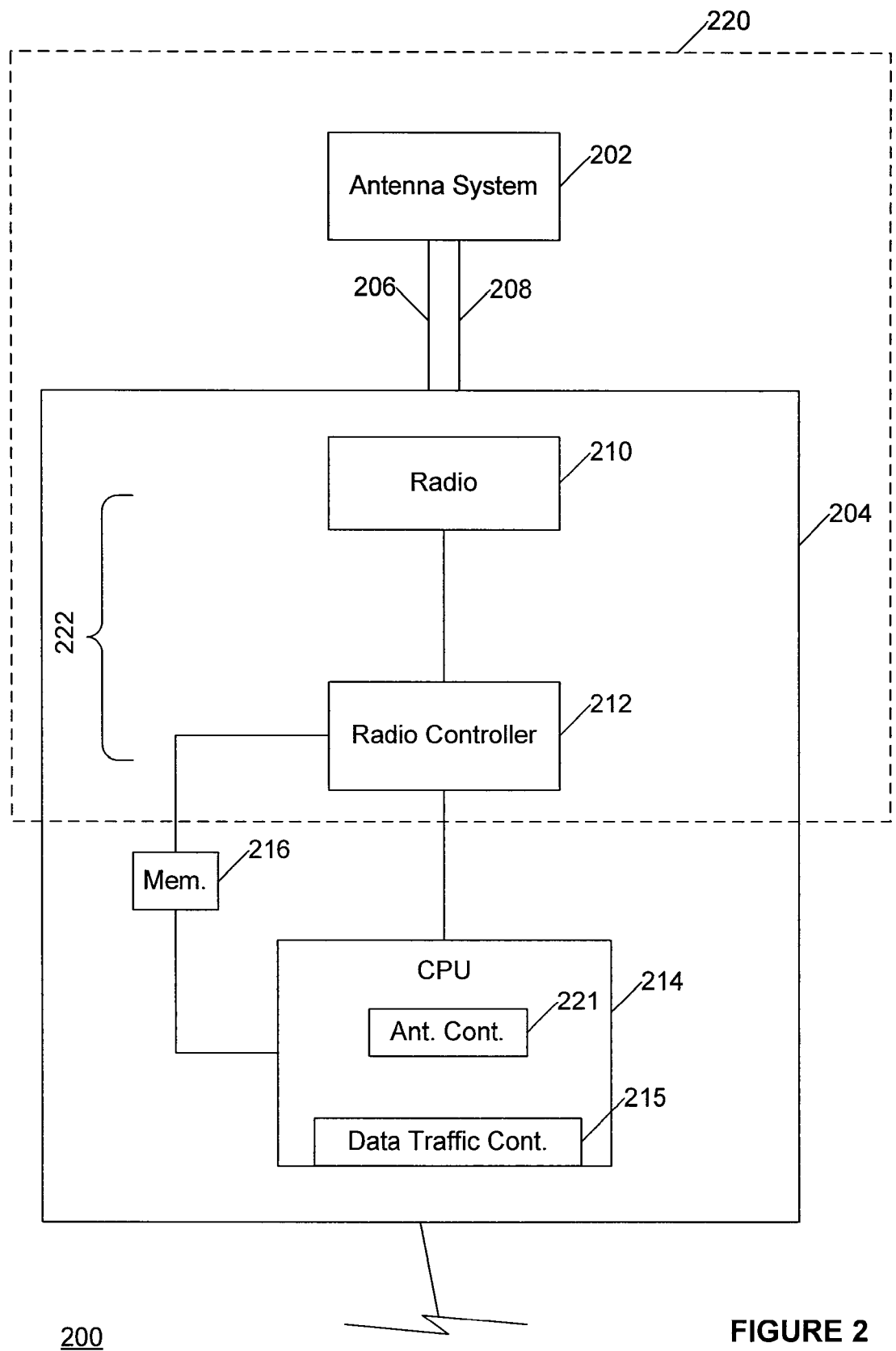
FIG. 2 is a functional block diagram of an example of a wireless communication device.

FIG. 2 is a functional block diagram of an example of a wireless communication device 200. For example, the wireless device can be a wireless router, a fixed or mobile access point, a client or station device or other type of wireless communication device. The communication device 200 includes a configurable antenna system 202 which is in communication with a radio system 204. A control line 206 communicatively couples the antenna system to the radio system to provides a path for control signals. A transmit and receive line 208 couples the antenna system and the radio system for the transmission of transmitted and received signals to and from other wireless devices.

The configurable antenna system 202 can be selectively configured to create different antenna configurations including gain patterns and/or polarizations. For example, the configurable antenna system can include antennas which can be configured to a discrete number of antenna patterns. In one embodiment the configurable antenna system 202 includes one or more directional antennas which allows the antenna system to direct or steer the gain of the antenna system (for both transmitting and receiving) in more than one direction or pattern. Alternatively, the antenna system 202 can be a plurality of switchable omni-directional antennas which can be selectively coupled to the transmit and receive connection 208 of the radio system 204.

The radio system 204 includes a radio transmitter/receiver 210 which is in communication with a radio controller 212. The functions and systems of the radio transmitter/receiver 210 and the radio controller 212 as described herein are also collectively referred to as the radio sub-system 222. The radio generates radio signals which are transmitted by the antenna system 202 and receives radio signals from the antenna system 202. In one embodiment, the radio system 204 converts received radio signals to digital signals which are passed to the radio controller 212.

The radio controller 212 may implement some or all of the media access control (MAC) functions for the radio system. In general, MAC functions operate to allocate available bandwidth on one or more physical channels on transmissions to and from the communication device. The MAC functions can allocate the available bandwidth between the various services depending upon the priorities and rules imposed by their quality of service (QoS) requirements. In addition, the MAC functions operate to transport data between higher layers, such as TCP/IP, and a physical layer, such as a physical channel. However, the association of the functions described herein to specific functional blocks is only for ease of description. The various functions can be moved amongst the blocks, shared across blocks and grouped in various ways.

The central processing unit (CPU) 214 is in communication with the radio controller 212. The CPU 214 may share some of the MAC functions with the radio controller. In addition, the CPU 214 performs higher level functions which are generally referred to as data traffic control and represented by the data traffic control module 215. Data traffic control can include, for example, routing associated with a data traffic on a back haul connection, such as a DSL connection, and/or TCP/IP routing.

In one embodiment, the CPU, or processor 214, determines a plurality of transmit and receive signal quality metrics for connections between the wireless communication device and a plurality of stations for a first of the plurality of radios with a first configurable antenna system in a plurality of configurations. The processor determines a plurality of transmit and receive signal quality metrics for connections between the wireless communication device and the plurality of stations for a second of the plurality of radios with a second configurable antenna system in a plurality of configurations. The processor determines a connection matrix that includes the transmit and receive signal quality metrics for the first and second radios and the plurality of configurations of the first and second configurable antennas. A memory 216 stores the connection matrix. An antenna control module 221 selects an antenna configuration for the first and second antenna configurations based on the connection matrix.

In one embodiment, the data traffic control module 215 controls data flow to the first and second radios so that they transmit and receive independent data streams to a station. In another embodiment, the data traffic control module 215 controls data flow to the first and second radios so they transmit the same data stream to a station. In still another embodiment, the data traffic module 215 controls data traffic flow so that the first radio can transmit a first data stream to a first station and the second radio transmits a second data stream to a second station simultaneously. In yet another embodiment, the data traffic control module 215 controls data flow so that the first radio can transmit data to a first station and the second radio receives data for the first station.

The common or shared memory 216 can be accessed by both the radio controller 212 and the CPU 214. This allows for efficient transportation of packets between the CPU and the radio controller.

In one embodiment control of the antenna system 202 is integrated with the operation of wireless device including the MAC function and QoS (if provided). However, the advantages and benefits of a configurable antenna system can be incorporated into a wireless device with very little integration with such a system. In one embodiment, a radio card (elements in the dashed box 220 in FIGS. 2 and 10) is not modified other than coupling it to a configurable antenna system instead of an omni directional antenna. An antenna control module 221 can be included in the CPU 214. The antenna control module 214 determines the desired antenna configuration and generates the control signals to be sent to the antenna system 202. In response to the control signals, the antenna system changes to the desired configuration. In one embodiment the antenna control module 221 is provided with, or has access to, a signal quality metric for each received signal. The signal quality metric can be provided from the radio 210 or the radio controller 212. As described further below, the signal quality metric can be measured or determined by another device and transmitted to the device 200.

The signal quality metric can be used to determine or select the antenna configuration as will be explained more fully below.

The antenna control module 221 is provided with direct or indirect communication to the antenna system 202, for example via control line 206. In one embodiment, the antenna control module operates above the MAC layer of the system. The control signals from the antenna control module 221 can be transmitted directly from the CPU to the antenna system 202 or can be transmitted via the other elements of the radio system 204 such as the radio controller 212 or the radio 210. Alternatively, the radio control module 221 can reside on the radio controller 212 or the radio 210. The operation of one embodiment of the radio control module will be described below in more detail with regard to FIG. 10.

The methods described herein can be implemented within various of the functional blocks of FIG. 2. In addition, the methods or functions can be separated into components or modules that are performed by multiple blocks. In one embodiment, the elements within the dashed box 220 in FIG. 2 are a radio card (for example, a WLAN PCI card) which is coupled to the processor by a PCI (peripheral component interconnect) bus.

Figure 3:
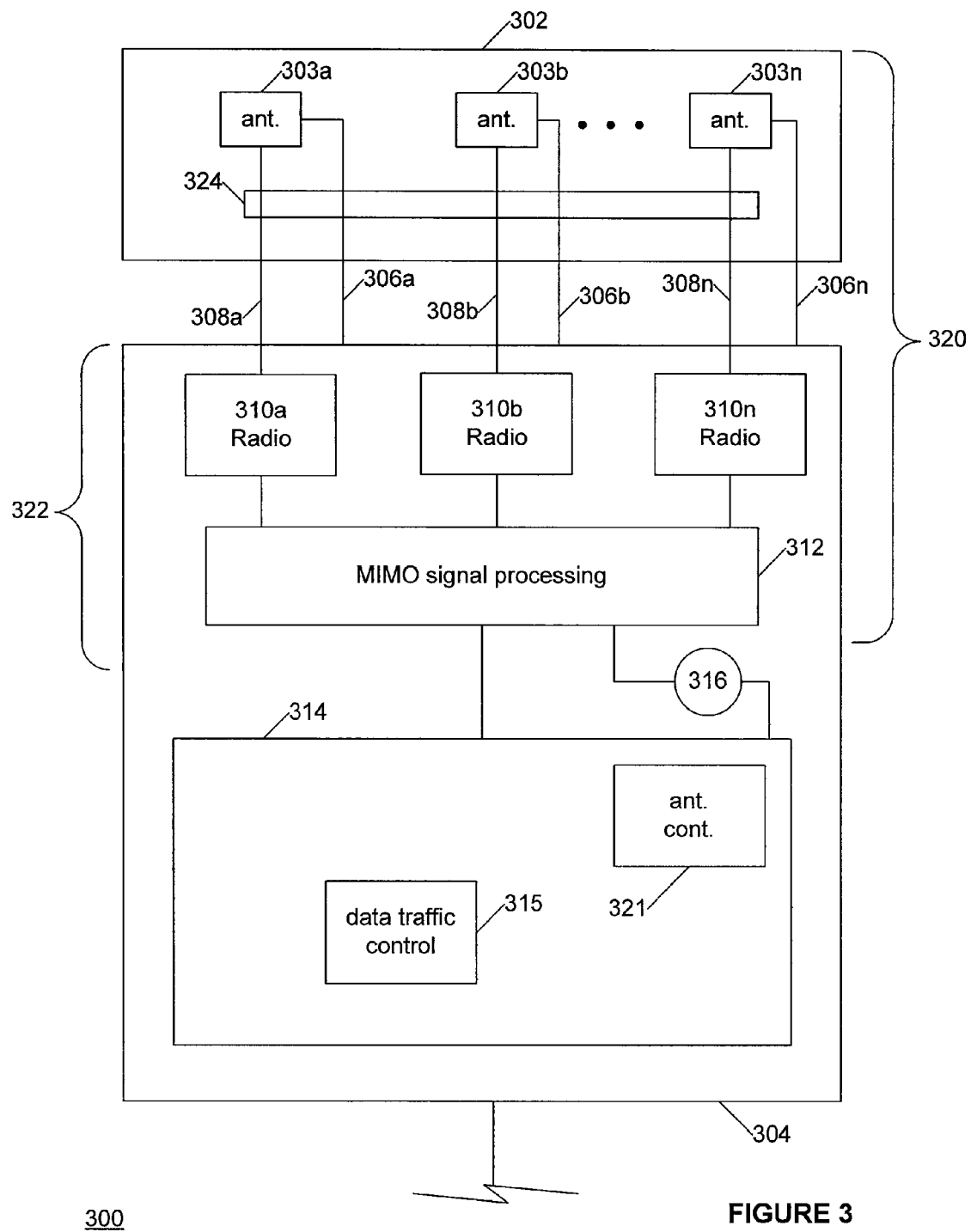
FIG. 3 is a functional block diagram of an alternative example of a wireless communication device.

FIG. 3 is a functional block diagram of an alternative embodiment of a wireless communication device 300. For example, the wireless device can be a wireless router, a station or client device, a fixed or mobile access point or other type of wireless communication device. In addition, the wireless device 300 can employ MIMO (multiple-in multiple-out) technology. In one embodiment, communication device 300 includes a configurable antenna system 302 which is in communication with a radio system 304. The antenna system can include a plurality of configurable antennas 303a-n. Although three configurable antennas are depicted, more or fewer such configurable antennas can be used. A plurality of control lines 306a-n communicatively couple the antenna system 302 to the radio system 304 to provide a path for control signals for controlling the configurations of the configurable antennas 303a-n. Alternatively, each of the configurable antennas 303a-n can be replaced with an antenna having a predetermined directional gain pattern. For example, the predetermined directional gain pattern for each of the antennas can cover a different direction. An example of such an antenna system that can be used to provide a predetermined directional gain pattern is described below. An alternative antenna system is described in provisional patent application ser. No. 60/863,893, filed Nov. 1, 2006, titled Compact Yagi Antenna, hereby incorporated by reference.

In an embodiment where the antennas 303a to 303n have predetermined directional patterns, the overall antenna system can direct its gain by allocating different weights to the signals received (or transmitted) by the radios 310a to 310n. For receiving signals, well known receive combine (for example, maximum ratio combine) techniques can be used to assign the weights to the signals. When transmitting signals, well known weighting techniques, such as, the so called water filling method of allocating weights based on signal quality can be used. An aspect of an embodiment where the antenna elements 303a to 303n are deliberately configured to have different directional characteristics, is that allocating different weights on the transmission/reception paths 308-310a to 308-310n effectively directs the gain of the antenna system in a selected, or desired, direction A plurality of transmit and receive lines 308a-n couples the antenna system and the radio system for communicating transmitted and received radio signals. Though the number of transmit and receive lines and the number of control lines depicted corresponds with the number of antennas depicted, that is not necessary. More or fewer such lines can be used as can multiplexing and switching techniques. In one embodiment the antenna system includes a controller 324 which receives the control signals and the transmit and receive signals. The controller can route the signals to the appropriate antenna and radio.

The configurable antenna system 302 can be selectively configured in response to control signals to create different antenna configurations which can include different antenna patterns and/or polarizations. In one embodiment the configurable antenna system 302 includes antennas which can be configured to a discrete number of antenna patterns. In one embodiment, the configurable antennas 303a-n each includes one or more directional antennas which allows the antenna system to direct or steer the gain of each of the configurable antennas (as well as the overall antenna system for both transmitting and receiving) in more than one direction or pattern. Alternatively, one or more of the antennas 303a-n can be a plurality of omni-directional antennas which can be selectively coupled to the transmit and receive signals of the radio system 304.

The radio system 304 includes a radio sub-system 322. The radio sub-system 322 includes a includes a plurality of radio transmitter/receivers (radios) 310a-n and a MIMO signal processing module (the signal processing module) 312. The plurality of radios 310a-n are in communication with the MIMO signal processing module. The radios generate radio signals which are transmitted by the antenna system 302 and receive radio signals from the antenna system. In one embodiment each configurable antenna 303a-n is coupled to a single corresponding radio 310a-n. Although each radio is depicted as being in communication with a corresponding antenna element by a transmit and receive line, more or fewer such lines can be used. In addition, in one embodiment the radios can be controllably connected to various ones of the antennas by multiplexing or switching.

The signal processing module 312 implements the MIMO processing. MIMO processing is well known in the art and includes the processing to send information out over two or more radio channels on two or more antennas and to receive information via multiple radio channels and antennas as well. The signal processing module 312 can combine the information received via the multiple antenna into a single data stream. The signal processing module 312, like the radio controller 212 of FIG. 2, may implement some or all of the media access control (MAC) functions for the radio system and control the operation of the radios so as to act as a MIMO system. A description of the MAC functions was provided in connection with FIG. 2 and will not be repeated here. The association of the functions described herein to specific functional blocks in the figure is only for ease of description. The various functions can be moved amongst the blocks, shared across blocks and grouped in various ways.

A central processing unit (CPU), or processor, 314 is in communication with the signal processor module 312. The CPU 314 may share some of the MAC functions with the signal processing module 312. In addition, the CPU can include a data traffic control module 315 which performs similar functions as the data traffic control module 215 described in connection with FIG. 2.

In one embodiment, the CPU, or processor, 315 determines a plurality of transmit and receive signal quality metrics for connections between the wireless communication device and a plurality of stations for a first of the plurality of radios with a first configurable antenna system in a plurality of configurations. The processor determines a plurality of transmit and receive signal quality metrics for connections between the wireless communication device and the plurality of stations for a second of the plurality of radios with a second configurable antenna system in a plurality of configurations. The processor determines a connection matrix that includes the transmit and receive signal quality metrics for the first and second radios and the plurality of configurations of the first and second configurable antennas. A memory 316 stores the connection matrix. An antenna control module 321 selects an antenna configuration for the first and second antenna configurations based on the connection matrix.

The common or shared memory 316 which can be accessed by both the signal processing module and the CPU can be used. This allows for efficient transportation of data packets between the CPU and the signal processing module.

In one embodiment an antenna control module 321 is included in the CPU 314. The antenna control module determines the desired configuration for each of the antenna 303a-n and generates the control signals to be sent to the antenna system 302. In one embodiment, the antenna control module 321 operates above the MAC layer of the system. In response to the control signals, the configuration of one or more of the antennas is changed. In one embodiment, all of the antennas are configured in the same manner. For example, all of the antennas can have their gain maximized in the same direction. Alternatively, each antenna can be individually configured. Further, the antennas can be configured into predetermined configurations. For example, one of the antennas can be configured to provide maximum gain in a primary direction and the other antennas can be configured for maximum gain in a direction that is a predetermined offset from the primary direction.

The antenna control module 321 can be provided with direct or indirect communication to the antenna system 302, for example via control lines 306a-n. More or fewer control lines than those shown can be used. The control signals from the antenna control module 321 can be transmitted directly from the CPU to the antenna system 302 or can be transmitted via the other elements of the radio system 304 such as the signal processing module 312 or the radios 310a-n. Alternatively, the antenna control module 321 can reside on the signal processing module 312 or in one or more of the radios 310a-n.

In one embodiment the antenna control module 321 is provided with or has access to a signal quality metric for each received signal and/or transmitted signal on a communication link. The signal quality metric can be provided from the MIMO signal processing module 312. The MIMO signal processing module has the ability to take into account MIMO processing before providing a signal quality metric for a communication link between the wireless communication device 300 and a station. For example, for each communication link the MIMO signal processing module 312 can select from one or more MIMO techniques such as receive diversity, maximum ratio combining, spatial multiplexing, and the like. The signal quality metric received from the signal processing module, for example, data through put or error rate, can vary based upon the MIMO technique being used. A signal quality metric, such as received signal strength, can also be supplied from one or more of the radios 710a-n. Typically, the radios would not take into account MIMO techniques, such as spatial multiplexing. In a MIMO system the signal quality metric can be used to determine or select a desired antenna configuration as described herein.

In one embodiment as was mentioned above, the signals received and/or transmitted by the radios 310a-n are combined, for example by maximum ratio combining, in the MIMO signal processor 312 or by the controller 324. For example, when conditions do not permit receiving (or transmitting) different data over each of the radios, the same data is transmitted (or received) by each radio. Rather than selecting the signal from one of the radios, the MIMO signal processor 312 and/or the controller 324 can combine some or all of the received signals in a weighted manner. In some circumstances, the weight assigned to one radio's signal can be zero.

The methods described can be implemented within various of the functional blocks of FIG. 3, for example, in the MIMO signal processing module 312 or the CPU 324. In addition, the methods or functions can be separated into components or modules that are performed by multiple blocks depicted in FIG. 3. In one embodiment, the elements indicated as 320 in FIG. 3 are implemented as a radio card (for example, a MIMO WLAN PCI card) which is coupled to the processor by a PCI (peripheral component interconnect) bus.

Wireless networks such as the one depicted in FIG. 1 typically operate by the access point 110 transmitting packets of information or data to one of the station 120A-D. The term packet as used herein refers to information transmitted to one or more recipients. The access point 110 may also occasionally transmit a packet intended for reception by all of the stations 120A-D (broadcasting). Further, the access point 110 may transmit a packet which is intended for reception by a selected group of the stations (multicasting). Additionally, stations wishing to transmit packets to the access point 110 may do so during defined periods of time while the access point is not transmitting. Such systems typically provide gaps or slots between the transmissions of packets by the access point during which stations wishing to send packets to the access point can transmit. Numerous such protocols have been developed and some have been standardized. For example, IEEE 802.11 and IEEE 802.16 define different protocols for such communication between stations and access points.

The following aspects are useful in defining the operation of an access point 110 with a configurable antenna system: (1) During operation of the access point it is desirable that the access point control its configurable antenna system such that it can always receive transmissions (during times when transmissions are expected) from all of the stations in the network. (2) Additionally it is desirable to deliver maximum antenna signal strength (gain) (preferably for both uplink and downlink), however not in such a way that it violates item (1). (3) It is also desirable to minimize the burden or overhead incurred by the access point in processing the calculations to satisfy items (1) and (2). Similar aspects can be applied to stations 120A-D with configurable antenna systems: (1) During operation of the station it is desirable that the station control its configurable antenna system such that it can always receive transmissions (during times when transmissions are expected) from its associated access point, even when the station is mobile. (2) Additionally, it is desirable to deliver maximum antenna signal strength (gain) (preferably for both uplink and downlink), however not in such a way that it violates item (1). (3) It is also desirable to minimize the burden or overhead incurred by the access point in processing the calculations to satisfy items (1) and (2).

In one embodiment, a viable set of antenna configurations or positions of the configurable antenna system of the access point 110 can be defined as the set of possible antenna configurations where all associated stations can be "heard" (during times when transmissions are expected or permitted). By heard, it means that packets transmitted by the stations can be successfully received by the access point 110. For a station with a configurable antenna, the viable set is all of the antenna configurations in which the associated access point can be heard or an omni-directional configuration.

In the system depicted in FIG. 1, each station 120A-D is located in a different direction with respect to the access point 110 and at a different distance. Signal quality metrics can be collected for the communication link for each of the stations 120A-D in all of the possible antenna configurations. It is also possible to collect signal quality metrics for each of the stations in less than all of the possible antenna configurations. In one embodiment the number of possible antenna configurations would depend upon, for example, the configurable antenna system (e.g., a direction-agile antenna) and the configuration of the wireless network.

Table 1 below depicts one example of signal quality metrics for each of the stations 120A-D. Where in the example of Table 1 a signal quality metric is determined for each of the stations 120A-D with the access point 110 antenna configured in each of the 12 configurations there are 12 possible antenna configurations for the access point 110 depicted in FIG. 1. In one embodiment, in a MIMO system that includes multiple radios and multiple configurable antennas, signal metrics for connections made between the multiple radios and other devices are arranged in a connection matrix. The connection matrix can include transmit and receive signal quality metrics for each of the multiple radios and their associated configurable antenna with the antenna in multiple configurations. In another embodiment, the antennas may be in a predetermined configuration and the connection matrix includes signal quality metrics for the radios and antennas. For example, each radio may be selectively connected to multiple predetermined antennas.

the amount of change to the signal quality metric from a new measurement can be limited. For example, a change can be limited to no more than a ten percent change per new measurement. This will have an effect similar to a multipoint moving average without the associated memory and processor overhead. The use of the term metric or signal quality metric herein encompasses both a single signal quality metric and a combination of signal quality metrics.

Referring again to Table 1 above, the set of antenna configurations can be reduced by only considering the antenna configurations where all of the stations 120A-D (FIG. 1) have a quality metric above a certain level. The level can be determined collectively or for each station based upon desired network performance and system characteristics. The level can vary by station and can change over time, for example, depending on the quality of service (data rate and/or latency) currently required by or assigned to a station. Additionally, the metric being used can also be changed by station or group of stations over time. For example, such changes could be advantageous due to a change in the network configuration. In one embodiment, a threshold or minimum value of quality metric can be set. For example, a sufficient quality metric may be set to be a metric value above 0. In this example, using the quality metrics listed in Table 1, antenna configuration number 9 would not be a member of the viable set (VS) of the antenna configurations because station A does not have a metric value above 0. The viable set (all of the antenna positions except for position number 9) can become an exclusive set of antenna configurations to be used for additional performance optimizations. Additionally, a second metric can be used to for one or more of the stations. For example, if signal

TABLE 1

| STA Location | Antenna Configuration | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | 14 | 8.33 | 8.67 | 7.33 | 7.33 | 13 | 9.33 | 9.33 | 0.0 | 8.33 | 9 | 12 |
| B | 13 | 13.67 | 21.33 | 11.33 | 22.67 | 24.67 | 24 | 20 | 16 | 16.33 | 17.33 | 14.67 |
| C | 16 | 12.68 | 8.33 | 13.67 | 9.33 | 13.33 | 11.33 | 11.33 | 5.33 | 16 | 8 | 18 |
| D | 37 | 38 | 36 | 34 | 31 | 34 | 30 | 34 | 24 | 35 | 34 | 34 |

It should be noted that many factors can affect the signal quality metrics. For example, factors such as distance, reflectance, path, multi-path, interference, weather, moving objects, and fixed objects can all affect the signal quality metric. Various signal quality metrics or a combination of signal quality metrics can be used. For example, the strength of the signal from a station received at the access point can be used, the signal to noise ration of the signal, error rates and the forward error correction value used (selected) by the radios can also be used.

In a multiple radio system (MIMO) transmitter/receiver combinations signal quality metrics can be in the form of a transmission channel matrix also referred to as a connection matrix, that describes the connection between each of the transmit/receive paths. Alternatively, or in addition, the signal quality metric can be measured or determined at the station with that information being transmitted to the access point. Because the signal quality metrics can vary over time and can have occasional dramatic swings, in one embodiment the signal quality metric is calculated using a multi-point moving average in order to smooth out temporary dramatic swings. For example, an average calculated over a fixed or varying number of measurements or over a fixed or varying time period can be used. Alternatively, in a simplified approach, strength is used as the signal metric to define the viable set, data throughput could be used as a secondary metric for a station with a high data rate requirement, e.g., a television set top box.

In one embodiment, once the viable set has been determined, the access point can have three operating states in connection with optimizing the configuration of the configurable antenna system. The first state exists when the access point is about to transmit one or more packets to a station. Prior to the transmission of the packet to a station, the access point looks up the highest quality connection (the highest signal quality metric) within the current viable set to determine which antenna configuration that provides the highest, or a desired, quality connection to that station. The antenna is then reconfigured (or remains configured if it is already in that configuration) to that configuration. For example, referring to FIG. 1 and Table 1 above, this would be antenna configuration 1 for station A, antenna configuration 6 for station B, antenna configuration 12 for station C, and antenna configuration 2 for station D.

Alternatively, the antenna can be configured to a configuration that is not necessarily in the viable set. For example, this would be acceptable if the antenna were to be reconfigured to a configuration within the viable set immediately after a transmission in a configuration not in the viable set was complete. In this embodiment the viable set defines acceptable receiving configurations but does not limit the transmitting positions. This approach permits the use of an antenna configuration that is the best or optimal configuration for transmissions to a station even if that configuration is not in the viable set.

The next operating state occurs when the access point receives a packet transmitted from one of the stations. Whenever the access point receives a packet from a station, the access point then reconfigures the direction-agile antenna to the configuration which provides the highest quality connection to that station. This is done in anticipation of additional packets being transmitted from that station. However, in wireless networks where stations are assigned specific time periods for transmitting packets to the access point, this operating state would occur during that time, for example, in some IEEE 802.16 implementations. As was noted above, a secondary metric can be used to select or define the configuration from the viable set which provides the highest quality connection to that station.

The next operating state is when the access point is idle. This would occur when no packets are being transmitted between known stations and the access point. In one embodiment, the access point then configures the antenna to the best known resting position from within the viable state. This position can be determined by evaluating the aggregate quality metrics for all known stations and selecting the position where the overall quality of signal received by the access point is the highest. In the example of Table 1 above, the best known resting position for the direction-agile antenna is configuration number 6. Various algorithms or approaches can be used to define the best known resting position. For example, the position can be selected by selecting the position at which no station falls below a minimum threshold. The threshold and metric can vary by station, for example, by taking into account the minimum bandwidth requirements of each station. For example, a station which is receiving a video stream will require a higher bandwidth allocation than a station which is idle. A secondary metric can also be used. The resting position of the antenna can be defined to require a minimum quality metric for the station receiving video which is conducive for video transmission while allowing for a much lower quality metric for a station which is idle. Therefore, it can be advantageous for the resting position to be selected according to current network requirements and characteristics, such as the type of traffic with each station (e.g., video, internet protocol, etc.) and the quality of service (QoS) associated with each station. Alternatively, in a MIMO system the resting position can be an aggregate antenna configuration (the combination of all of the radios) that provides an omni-directional or near omni-directional aggregate pattern. This would enable each of the radio channels to benefit from the high gain of a directional antenna and still ensure that all incoming signal directions are covered by the antenna pattern.

In one embodiment, in order to minimize overhead, or burden on the processor(s) of the access point, signal quality metrics can be captured whenever normal traffic occurs between the stations and the access point. Additionally, the access point can "scan" to gather the signal quality metrics needed to fully populate the viable set. A scan can be accomplished by transmitting a message which requests reply or transmission. The frequency of the scanning and which stations are scanned can be selected depending on the characteristics of the wireless network. For example, stations with relatively low signal quality metrics can be scanned more frequently than those with higher signal quality metrics. Additionally, stations with lower traffic rates or with the longest time since traffic has occurred would be the first stations to be scanned. Further, scanning can occur more frequently for the whole system when the signal the signal quality metrics are observed to be changing dramatically and frequently, such as in highly reflective environments, multi-path environments and places with a lot of moving objects. Capturing signal quality metrics during normal traffic can also include configuring the antenna to different acceptable, but not optimal, configurations in order to capture signal quality metrics for other configurations and reduce the need for scanning. For example, referring to Table 1 above, station A could periodically or occasionally communicate for normal traffic in any configuration but configuration 9 in order to capture signal quality metrics for those different configurations even though its optimal configuration in the viable set is configuration 1.

In addition to the configuration of the configurable antenna system of the access point, the power of the signal transmitted by the access point (and the power of the signal transmitted by the stations) can also be varied to optimize the operation of the wireless network. In many wireless networks, improved transmission characteristics allow for higher data transmission rates. For example, IEEE 802.11a and g (and draft n) provide for the transmission of data at various rates using different data encoding mechanisms with different data throughput rates, such as OFDM (orthogonal frequency division multiplexing), depending upon the quality of the transmitted signal. Varying the power of the transmitted signal along with the configuration of the configurable antenna system can lead to further optimization of data transmission through the wireless network. For example, the lowest transmission power level which achieves the highest throughput can be selected for each station. This approach can decrease interference with other nearby networks. For example, transmitting a signal with a power level greater than necessary to achieve the highest possible bit rate encoding may unnecessarily cause interference with other adjacent or nearby networks. In addition, varying the power of the signal transmitted from the access point can prevent transmitting too strong a signal to a nearby (versus a far away) station which can cause distortion and degrade the signal quality in certain circumstances.

Figure 4:
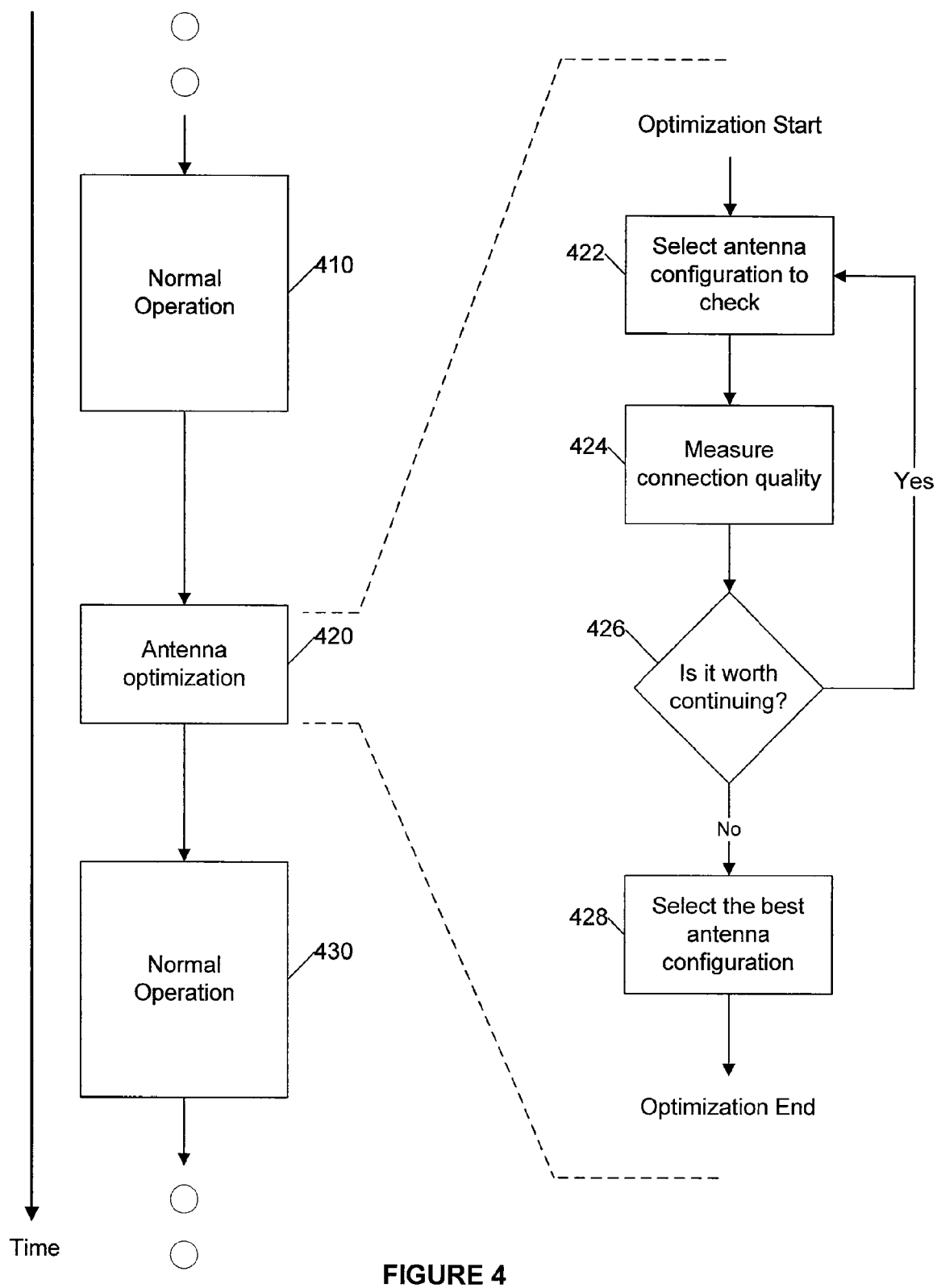
FIG. 4 is a flow chart of a process for operation of an a configurable antenna system.

FIG. 4 is a flow chart of an embodiment of the operation of the access point 110 in regards to optimizing the antenna configuration. As was described above in connection with FIG. 1, an access point can have three operating states that can be considered normal operation in connection with optimizing or selecting the antenna configuration. Those states were described above as the state when the access point is about to transmit a packet to a station, the state when the access point receives a packet from the station, and the state when the access point is idle. Those states are encompassed within "normal operation" 410 and 430 in FIG. 4. During certain time intervals, the access point performs the operations which allow it to determine optimal antenna configurations. That process is referred to as antenna optimization which is represented by block 420. The determination of when antenna optimization should be performed is described in more detail below. As is represented in the flow chart of FIG. 4, after antenna optimization 420 is completed, the access point then returns to normal operation 430. Cycling between normal operation and antenna optimization continues on throughout operation of the access point. However, in one embodiment antenna optimization can be interrupted so as not to interfere with quality of service and then resumed after quality of service obligations have been met.

Antenna optimization begins by selecting an antenna position or configuration as represented by block 422. The antenna is then set to that configuration and the signal quality metric is measured for one or more transmissions with the antenna in that configuration as represented by block 424. In this step 424, the appropriate power level for transmitting to the station can also be determined. In one embodiment the signal quality metric is measured for a single station by sending a polling request from the access point to a station and receiving the response from the polled station at the access point. Alternatively, the signal quality metric for more than one station can be measured during this step.

The access point then determines whether the process should be repeated for an additional antenna configuration as represented by decision block 426. The criteria for that determination can include, for example, whether packets are backing up for transmission at the access point, the total amount of elapsed time in performing the evaluation, and the relationship of the number of clients and the level of quality metrics already found. As represented by blocks 428, the best position for any of the stations for whom the signal quality metric was measured during the antenna optimization is then re-evaluated based upon the new measurements to identify the best antenna configuration for that station.

Alternatively, the access point can transmit a packet (preferably, the smallest type packet permitted) in each of the possible configurations in a series. One or more of the stations can then determine which configuration was best for them. The one or more stations can then transmit that information to the access point. When the stations have configurable antenna systems, this can also be done in reverse to allow the stations to determine their best configurations. The access point can store the best antenna configuration for each station in memory and utilize it later when it needs to communicate with any of the stations.

When a station utilizes a configurable antenna system, there can be a problem in that the station and the access point have the opportunity to lock onto each other or select a "best configuration" while not pointing in the correct (or best) antenna configuration for highest performance. For example, this can occur when the access point and the station are used in bridge mode (or what's known as infrastructure mode). Therefore, in one embodiment, the station is configured to operate as follows. Upon wake up or initialization, the station operates in a pseudo omni-directional mode with all antenna elements enabled. Alternatively, the station's antenna is configured so as to provide the best possible omni-directional pattern. The station then waits for an association to an access point to occur. The station continues to operate in the same antenna configuration until the access point has completed two antenna optimization (420) cycles. The station can then perform its own optimization. The period for performing optimization by the station is selected to be a non-integral of the optimization period for the access point (at least doubled to allow for two AP scans to occur). This process allows the access point to first determine the best direction to point to the station when the station is in omni mode and then, only after the access point has optimized, to then allow the station to optimize. It will also minimize the opportunity for the access point and station to overlap in their optimization cycles.

Figure 5:
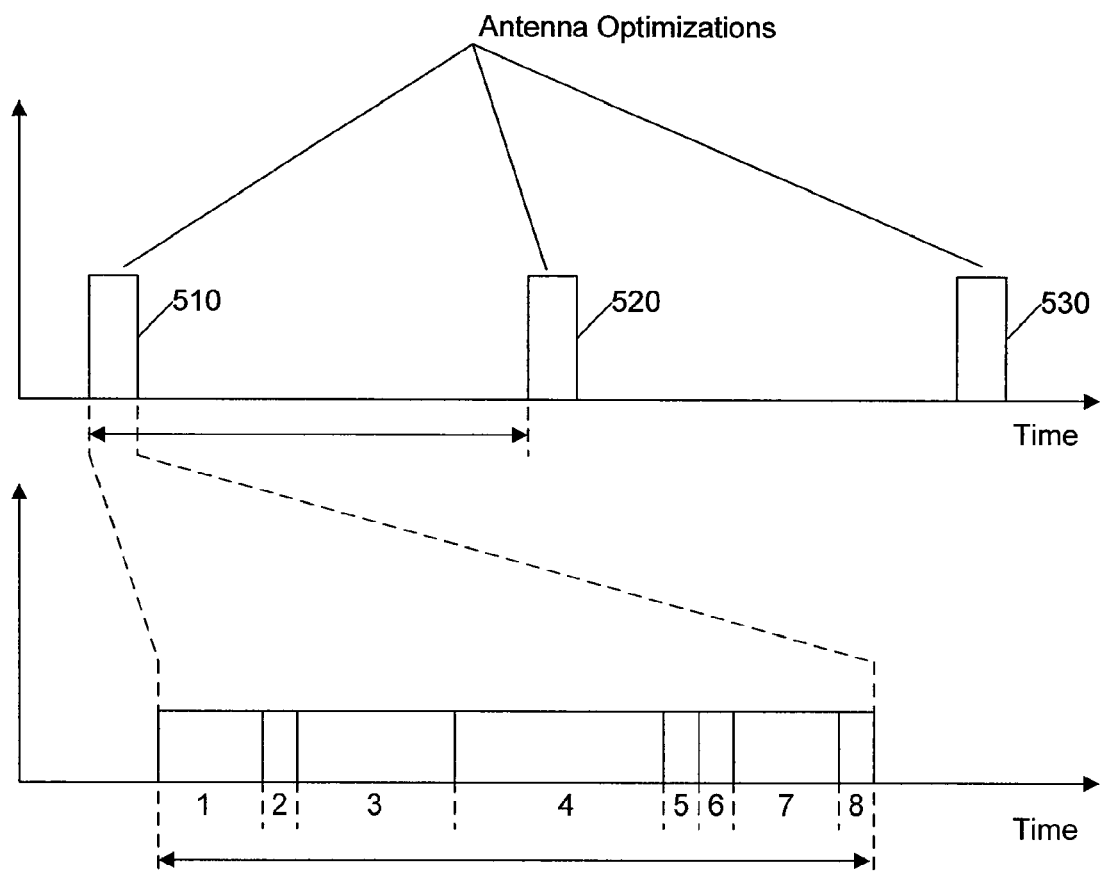
FIG. 5 is a timeline representing the operation of an access point with regard to antenna optimization and normal operation.

FIG. 5 is a timeline representing one embodiment of the operation of an access point, such as the access point depicted in FIG. 1, with regard to antenna optimization and normal operation. Unlike the system depicted in Table 1 above, in FIG. 5 the direction-agile antenna only has 8 possible configurations. The antenna optimization process is represented on the upper timeline by time periods 510, 520 and 530. The lower timeline is an expanded view of the time period 510.

During the antenna optimization process regular data traffic is stopped in order not to affect the signal quality metric measurements. This interruption of the data traffic can be considered as overhead introduced by the antenna optimization. The amount of overhead caused by the antenna optimization process depends on the amount of time required to perform the process (duration) and the amount of time between which elapses between repeating the optimization process (period or frequency).

$$\text{Overhead} = \frac{\text{Optimization duration}}{(\text{Optimization period} + \text{duration})} \times 100\%$$

In general, the optimization duration equals the sum of the amount of time required to measure the signal quality metric for each antenna configuration. The duration of the optimization process can vary depending on the number of stations and other factors such as timeouts. A timeout can occur when the access point transmits a request to a station (e.g., a polling request to which a station is expected to respond) and does not receive a response within a predetermined timeout period. In the example depicted in FIG. 5 the time required to measure the signal metric for antenna configurations 1-8 are 3, 2, 4, 5, 2, 2, 4 and 2 milliseconds, respectively. Therefore the antenna optimization process requires 24 milliseconds. If the time between optimization period is four seconds, then the overhead is 24/(4000+24)×100%=0.6% overhead. The optimization duration and the optimization period are adjustable parameters. They can be set and adjusted so that the overhead imposed on the access point will not exceed a desired or selected value.

In one embodiment, when an access point has multiple associated stations, the antenna optimization process is performed for only one station during one optimizational period. The antenna optimization process can be performed for each station in turn or according to other criteria, such as more frequently for stations with signals that vary more over time than other stations or less frequently, or not at all for stations with very strong signals.

Figure 6A:
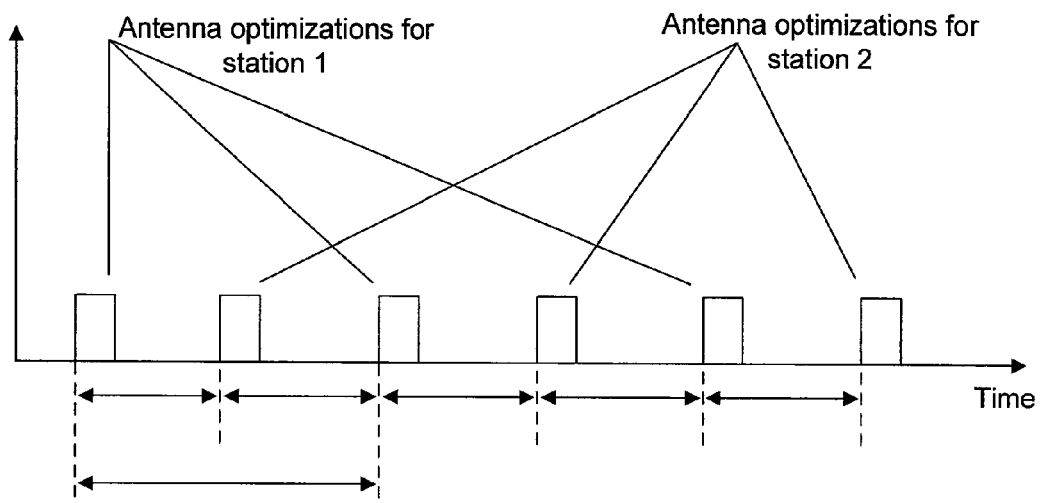
FIG. 6A is a timeline representing antenna optimizations being performed in a system having two stations.
Figure 6B:
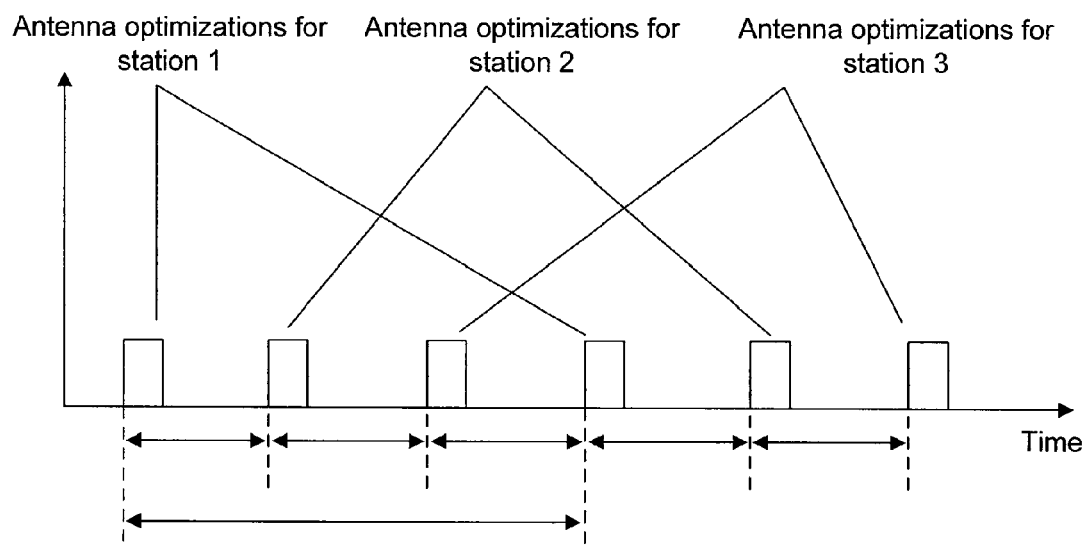
FIG. 6B is a timeline representing antenna optimization being performed in a system having three stations.

FIGS. 6A and 6B are timelines representing antenna optimizations being performed in a system having two stations in FIG. 6A and for a system having three stations in FIG. 6B. The scale of the two timelines is the same. Comparing FIG. 6A and FIG. 6B shows that performing the antenna optimization process for one station per optimization period and performing the optimization for each station in turn causes the optimization period for a single station to increase as stations are added to the wireless network. For example, if the optimization period is two seconds, in the system represented by the timeline of FIG. 6A, the optimization period for each individual station is four seconds. In the system represented by the timeline in FIG. 6B, the optimization period for each station has increased to six seconds.

Therefore, it can be beneficial to take other factors into account when determining which station to perform optimization for. For example, once the antenna optimization process has been determined for all of the stations, an analysis of that data can determine that certain stations are positioned relative to the access point such that their signal quality metric is sufficiently high for all antenna configurations such that the antenna optimization process will not need to be run again for that station, or will only need to be rarely run for that station, or can be run when a dramatic decline in the signal quality metric is detected during normal traffic. This approach reduces the number of stations for which the antenna optimization process has to be run on a routine basis and therefore can increase the frequency with which the antenna optimization process is performed on the remaining stations. To further increase the efficiency of the antenna optimization and to therefore decrease the amount of overhead it imposes on the access point, the overall antenna optimization process can further be streamlined by utilizing one or more of the following modifications. The number of antenna configurations measured per optimization process can be reduced by not measuring, or infrequently measuring, positions which have statistically shown low or high metrics. Stations which have been inactive for a predetermined period of time can also be skipped in the optimization process.

Figure 7:
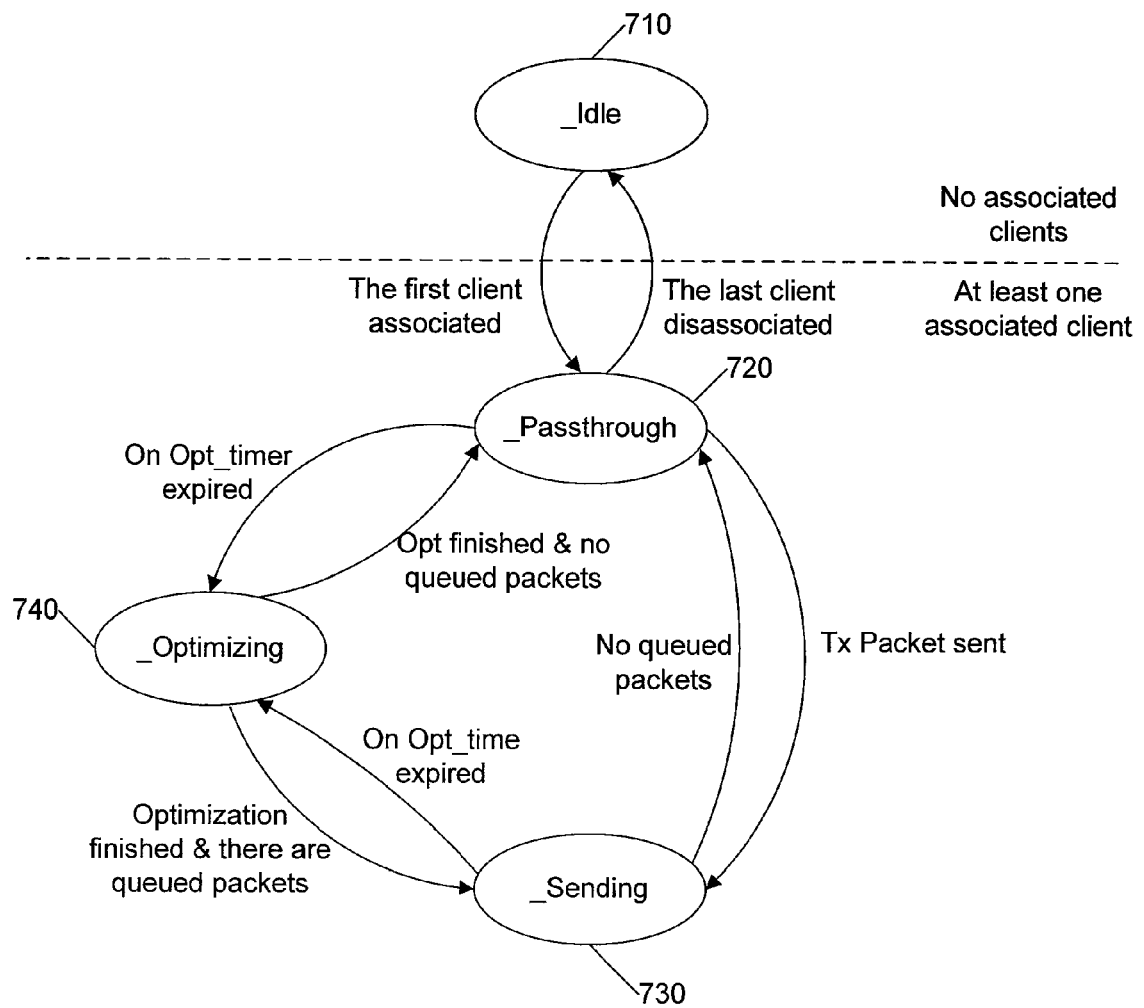
FIG. 7 is a state diagram of the operation of an access point.

FIG. 7 is a more detailed state diagram of one embodiment of the operation of an access point with regard to the configuration of the antenna system. The access point begins in an idle state 710. In the idle state 710 no stations have yet been associated or registered with the access point. For example, this state would occur when an access point is first initialized. When the access point is in the idle state 710, it continuously scans through each of the available antenna configurations. For example, it can configure the antenna system to each of the available configurations for 300 milliseconds per configuration and continue to cycle through those configurations until a station is detected. Alternatively, the antenna system can remain in a single configuration, for example, an omni-directional configuration, until a station is detected.

Once the first station is detected and becomes associated or registered with the access point, the access point transitions to the pass-through state 720. In the pass-through state 720 packets received from the station are processed as follows. All received packets are merely routed on. For example, in the embodiment where the access point is a wireless router, such as DSL router, received packets would be transmitted to the DSL connection. The access point does not take into account the optimum configuration for the transmitting station. Alternatively, when a packet is received from a station, the antenna system can then be switched to the configuration which provides the best connection with that station or to the configuration which is defined as the optimum for that station (e.g., taking other factors than the quality of the signal from that station into account).

In the pass-through state 720 packets being transmitted by the access point to a station are handled as follows. When a packet is ready to be transmitted, the antenna system is configured to the configuration which provides the best communication link with that station and the access point transitions to the sending state 730.

In one embodiment when there is only one station associated with the access point, for the majority of the time the access point keeps the antenna system in the configuration which provides the best connection with that station. However, because that configuration may impede the ability of other stations to associate or register with the access point, during periods when no packets are being received from the associated station or are being transmitted to the associated station, the access point can be configured to periodically configure the antenna system to one or more different configurations. For example, it can configure a direction-agile antenna to a configuration which provides gain in the direction that is opposite to the configuration of the one associated client.

When the access point is in the sending state 730, all packets received from stations are immediately routed on. Outgoing transmitted packets are treated differently, depending on the nature of the transmission traffic. When there are no queued packets (packets at the access point waiting to be transmitted) and all outgoing packets are directed to the same station, they are sent immediately. As soon as the first packet to be transmitted to another station is detected, the access point begins to queue packets to be transmitted. In one embodiment, a separate queue is established for each station for which transmit packets have been received. Alternatively, the queues can be established based upon antenna configurations. For example, if two stations have the same preferred antenna configuration, their packets would be stored in the same queue. The access point then selects one of the queues for which transmit packets has been received and transmits a predetermined number of those packets. Prior to transmitting those packets, the antenna system is configured to the configuration which is optimal for that station (or stations). As soon as the sending of those packets is completed, the access point selects the next transmit queue for the next station for which packets have been queued and transmits all those packets up to a preset maximum number. In advance of that transmission, the direction-agile antenna is again configured to the configuration which provides the best connection for that station (or stations). This process continues until all of the queued packets have been transmitted.

In addition, in systems that include quality of service (QoS), the access point also takes the QoS associated with the packet and/or a station into account when determining which queue should be transmitted and how many packets in a queue should be transmitted. The access point can also take into account the length of time required to change configuration of the antenna system as part of that process, e.g., can the antenna be reconfigured between the transmission of individual packets without imposing unacceptable performance degradation. In systems with QoS, the access point selects which queue to transmit and how many packets in the queue should be transmitted before moving on to a different queue based upon the QoS scheme of the system. In other words, the optimization of the transmission of packets is dependent upon the QoS associated with the packet.

In addition, the access point can maintain separate queues for multi-casting and for broad casting. Packets which are broad cast (intended to be received by all stations) are kept in a broad cast queue and the antenna system is configured to a position which provides the best overall transmission to all of the stations (e.g., the idle position) when that queue is transmitted. Multi-cast packets are packets intended for selected groups of stations. The antenna configuration for transmitting a multi-cast packet will preferably be one that maximizes the transmission quality for the group on intended recipients. Therefore, the antenna configuration for transmitting a multi-cast packet will depend upon the stations for which packet is intended.

Once all of the queues have been emptied, the access point transitions to the pass-through state 720. When the access point is in the sending state, it periodically determines whether the optimization process should be started. When it determines that that process should be started, it transitions into the optimizing state 740. For example, the optimization can be scheduled to occur on a fixed periodic basis. Alternatively, the time of the optimization process can be dynamic so as to keep the overhead incurred by the optimization process below a pre-determined value. Alternatively, the access point can transition from the pass through state 720 to the optimizing state 740. Again, the optimizing can be scheduled or it can be dynamic.

In the optimization state 740, the access point selects the station for which the optimization process will be performed.

Ways in which that determination can be made were described above. The access point then measures the link quality in each of the allowed antenna configurations, recalculates the viable set of antenna positions and determines the best viable position for that station. Then, depending on whether there are outstanding transmit packets, the access point transitions to either the pass-through state or the sending state. While the access point is in the optimizing state, all incoming packets to be transmitted are placed into the queues.

Figure 8A:
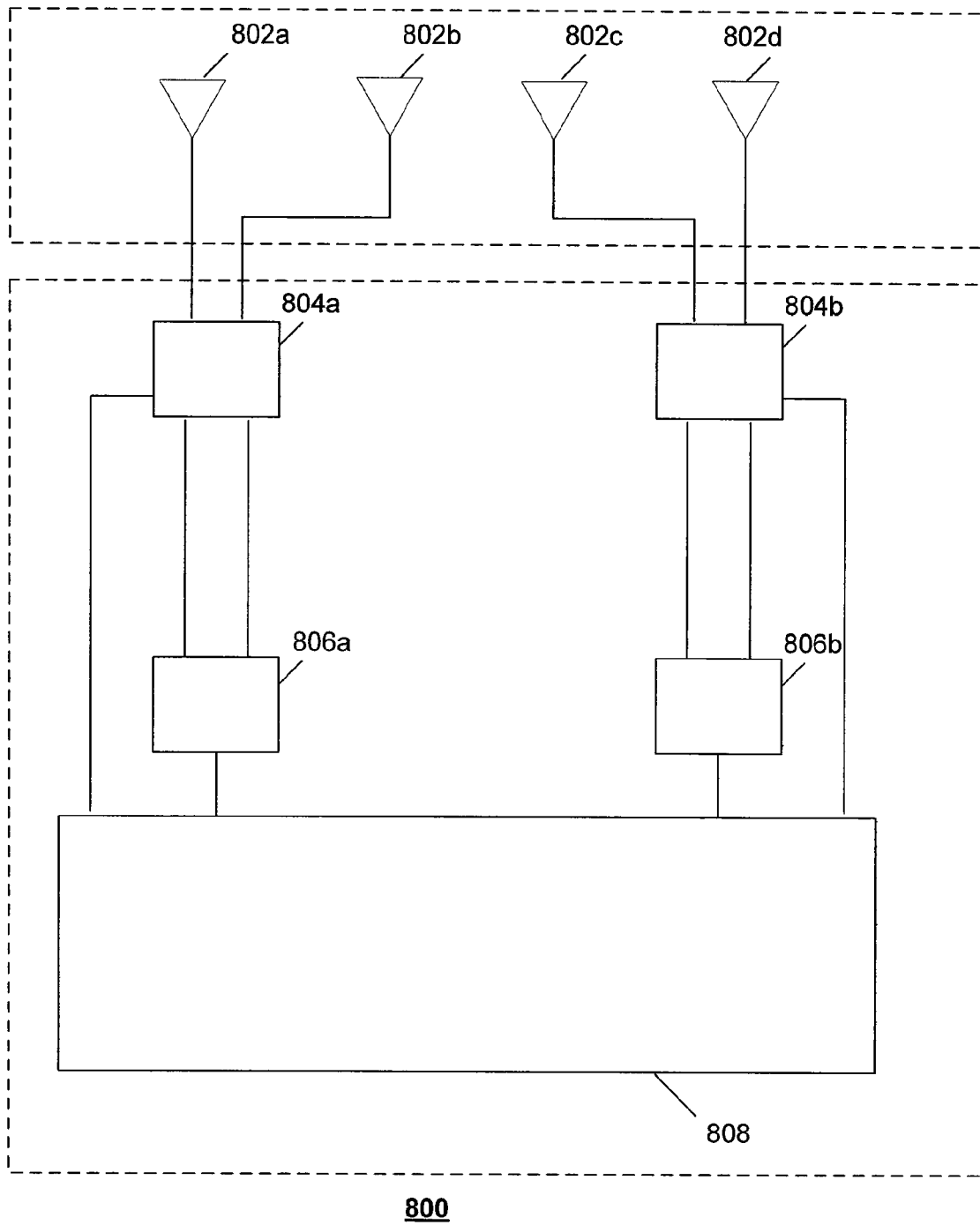
FIG. 8A is a functional block diagram of an alternative embodiment of a wireless communication device 800.

FIG. 8A is a functional block diagram of an alternative embodiment of a wireless communication device 800. For example, the wireless device can be a wireless router, a station or client device, or a fixed or mobile access point, or other type of wireless communication device. The wireless device 800 employs MIMO (multiple-in multiple-out) technology.

The wireless device 800 includes an antenna system which includes 4 directional antennas. Examples of the antenna system are described below. In one embodiment, the patterns of each of the directional antennas are nearly mutually exclusive. For example each antenna element can be configured to primarily cover a quadrant. Alternatively, two opposing antenna elements with mutually exclusive patterns, or nearly mutually exclusive, can be used. Antenna elements 802a and 802b are coupled to a first switch system 804a. Similarly, antenna elements 802c and 802d are coupled to a second switch system 804b. The switches 804a and b can switch between the transmit and receive paths of their associated radio transceiver, 806a and b respectively. Additionally, the switches 804a and b can switch between their two associated antennas. In that manner the transmit and receive paths of each radio can be coupled to one of two antennas at any point in time. A baseband or MIMO processor 808 is coupled to each of the radios and provides control signals to each of the switches. However, the function of controlling the switches can also be implemented in the radios. The methods described herein can be implemented in the baseband processor or the radios to determine which antenna to use at what time.

Figure 8B:
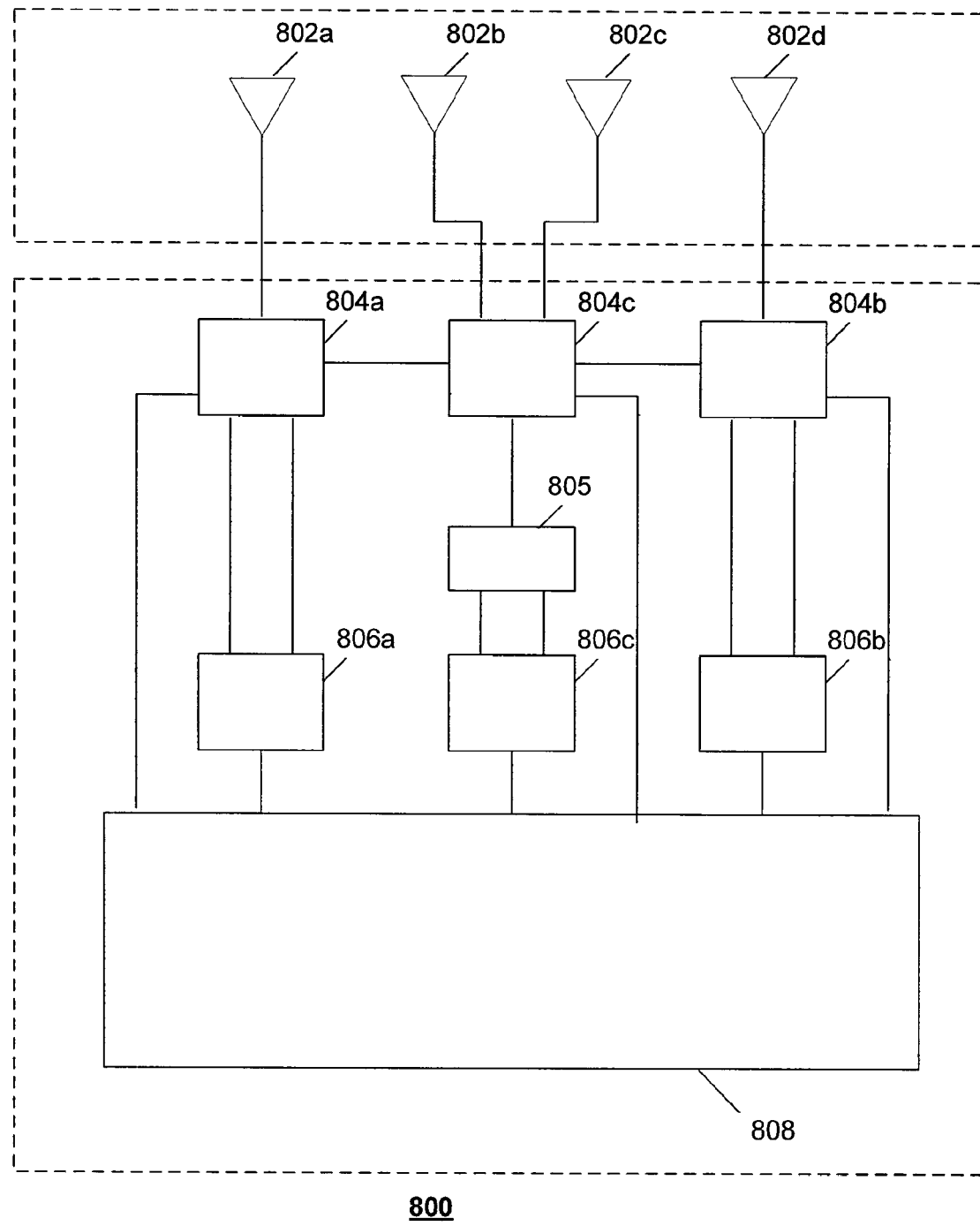
FIG. 8B is a functional block diagram of an alternative embodiment of the system depicted in FIG. 8A.

FIG. 8B is a functional block diagram of an alternative embodiment of the wireless device depicted in FIG. 8A. The system depicted in FIG. 8B utilizes three radios 806a, b, and c instead of the two depicted in FIG. 8B.

The wireless device includes an antenna system which includes 4 directional antennas. Examples of the antenna system are described below. In this embodiment, the first switch system 804a is coupled to antenna element 802a and to a diversity switch 804c. Similarly, the second switch 804b is coupled to antenna element 802d and to the diversity switch 804c. The diversity switch 804c is coupled to antenna elements 802b and c and to a transmit/receive switch 805. The transmit/receive switch 805 switches between the transmit and receive paths of the radio 806c. This arrangement allows for the radio 806a to be coupled to antenna element 802a or b, radio 806b to be coupled to antenna element 802c or d and radio 806c to be coupled to antenna element 802b or c. The baseband or MIMO processor 808 implements a process that assigns priorities and resolves conflicts between the radios. For example, radio 806c can have first choice of antenna elements 802b and c. The antenna element that is not selected is then made available to the associated other radio. In an alternative embodiment, the diversity switch is configured to allow radios 806a and b access to either of antenna elements 802b and c. The methods described herein can be implemented in the baseband processor or the radios to determine which antenna to use at what time.

For the various embodiments described in connection with FIGS. 8A and B, more or fewer antenna elements can be used as can different switching combinations between the radios and the antenna elements.

Figure 9:
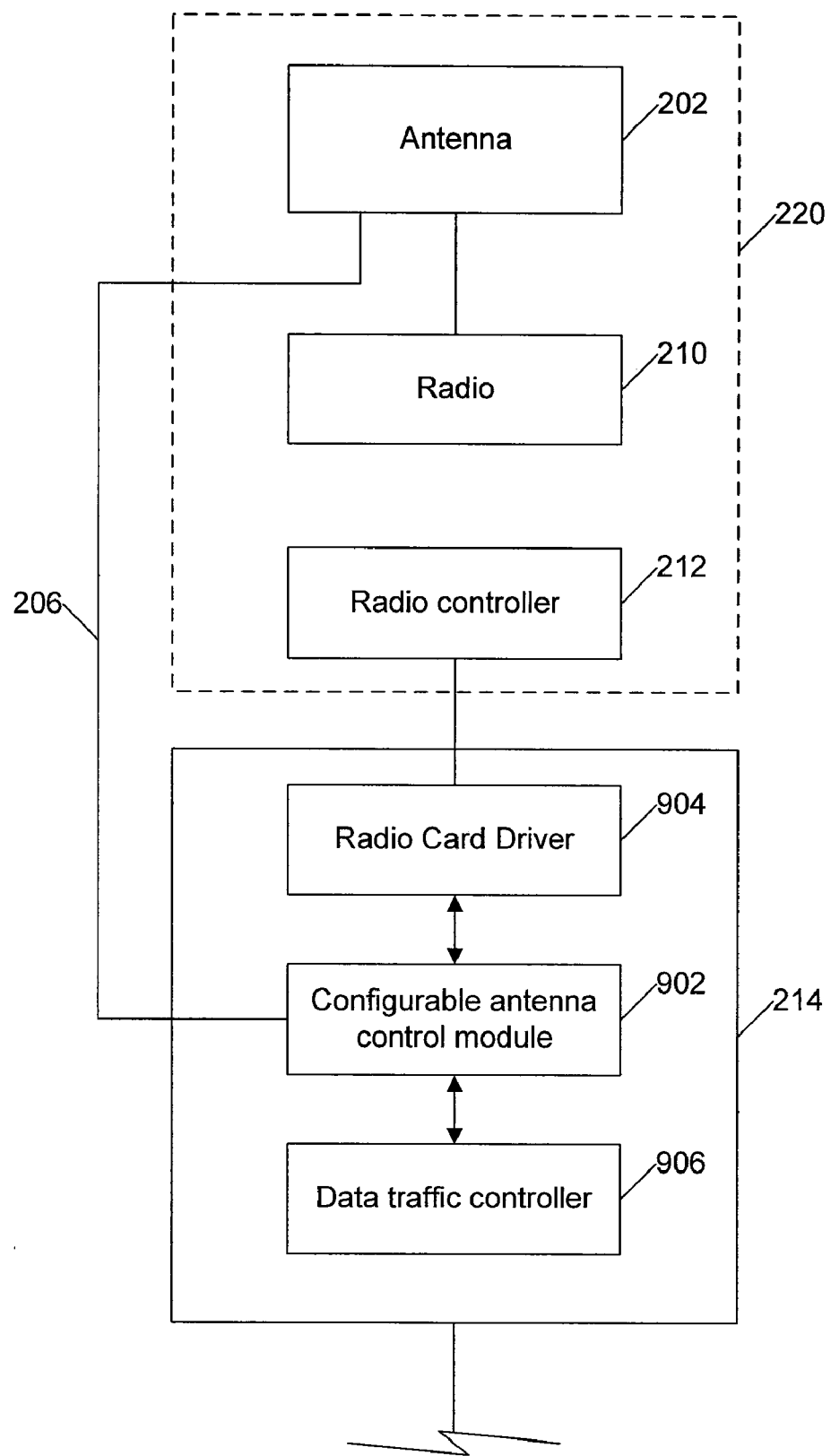
FIG. 9 is a functional block diagram showing the functional elements of FIG. 6 with additional details of the functions of the CPU.

FIG. 9 is a functional block diagram showing the functional elements of FIG. 2 with additional details of the functions of the CPU depicted for an embodiment when the control of the configurable antenna is not tightly integrated with the functions of the radio card 220. A configurable antenna control module (the CAC module) 902 is shown inserted between the radio card driver 904 and the data traffic controller 906. The CAC module 902 provides an interface and control layer between the card driver 904 and the data traffic controller 906.

The CAC module 902 can be thought of as a sort of a packet handler. The CAC module can intercept all incoming and outgoing packets and process them according to the requirements of the methods described above in connection with FIGS. 1-9. The CAC module can modify packets, delay them, change the transmission order, etc. All these actions can be separated into several elementary functions performed on packets (e.g. to send, to put into the queue etc.).

In one embodiment the CAC module 902 performs the following functions:

Transmit-Flow related: receive outgoing packets from the data traffic controller 906; pass outgoing packets (received from the data traffic controller) to the radio card driver 904 in accordance with the desired transmission timing; inform the data traffic controller 906 about the status of sending packets; form proprietary packets for transmission (for example, packets sent as part of the optimization process); pass generated proprietary packets to the radio card driver 904 (for transmission over the air);

Receive-Flow related: receive incoming packets from the radio card driver 904; filter out proprietary incoming packets (received from the radio card driver) and process them (for example, packets having signal quality metric information and responses to polling requests used as part of the optimization process described above); pass incoming data packets (all packets that are not proprietary) to the data traffic controller 906.

Other operations: form/generate antenna control commands according to the methods described in connection with FIGS. 1-9; pass antenna control commands to the configurable antenna system 602 (directly or indirectly); receive commands from the data traffic controller 906 (e.g. configuration options and requests for specific information); and pass specific information (e.g. operation mode related, statistics, etc.) to the data traffic controller 906.

Figure 10:
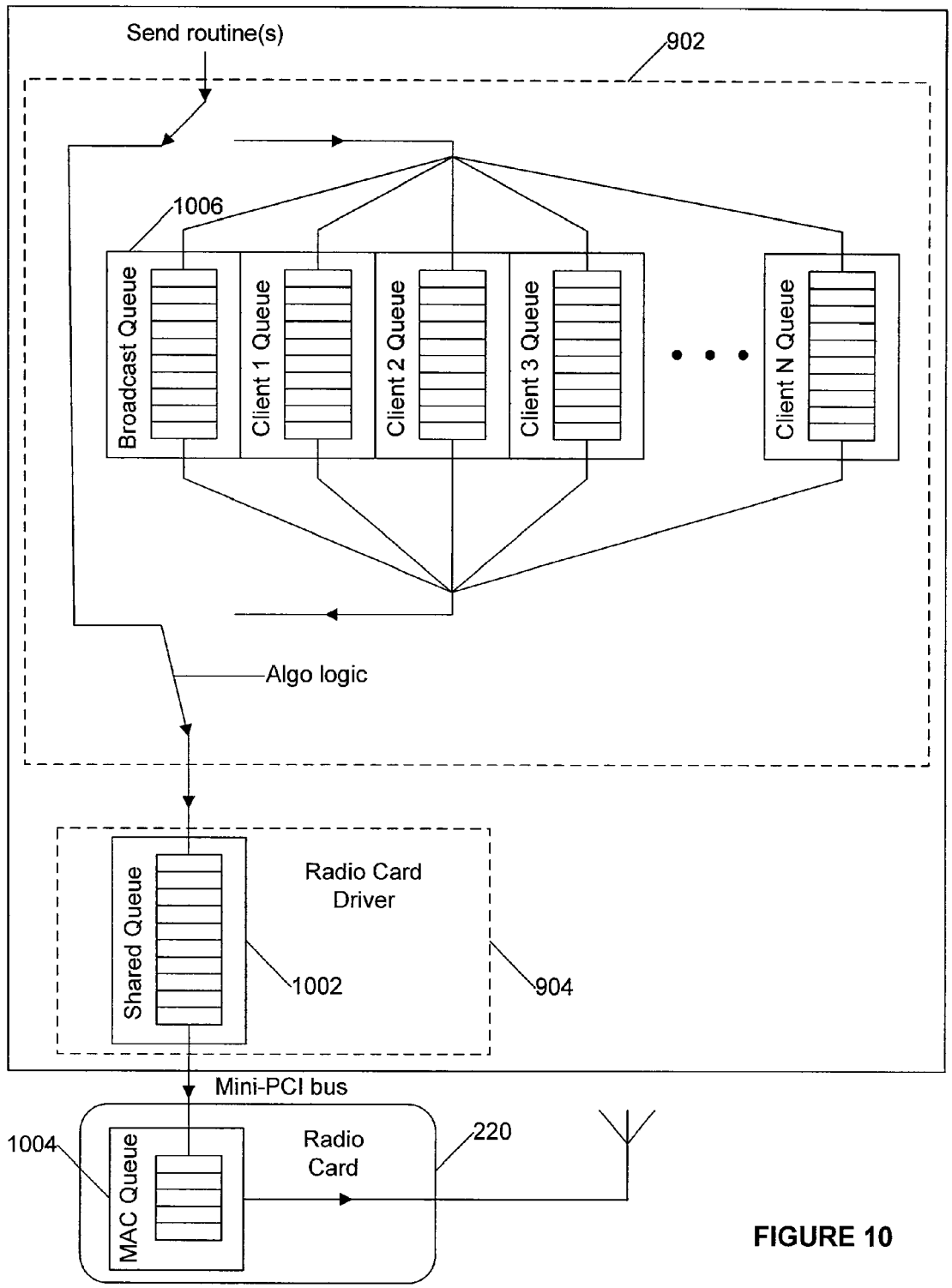
FIG. 10 is a graphical representation of the various queues utilized during the operation of the system depicted in FIGS. 8A and 8B.

FIG. 10 is a graphical representation of the various queues utilized during the operation of the system depicted in FIGS. 8A and 8B when configured as an access point. As packets are received by the CPU 214 for transmission via the radio card 220 they are passed from the data traffic controller 906 to the CAC module 902. A shared queue 1002 is accessible by the radio card driver 904 and the CAC module 902. For example, the shared queue 1102 can be located in the shared memory 216 shown in FIG. 2. A MAC queue 1104 is typically located on the radio card 220 and is the location in which packets are stored immediately prior to transmission. The CAC module 902 maintains a series of queues generally indicated as 1106. The CAC queues include one queue for each station associated with the wireless device and one queue for packets that are to be broadcast to all stations. Additionally, the CAC module 902 can maintain a queue for one or more multi-cast groups. In general, by careful control of the placing of packets into the shared queue 1106, the CAC module can control the timing of the transmission of packets by the radio card 220. That allows the CAC module to coordinate the transmission of packets with its control of the configurable antenna system 602.

In one embodiment, when the wireless device is configured as an access point and has only one associated station, the CAC module can send packets to be transmitted directly into the shared queue without queuing. When the CAC module is optimizing the antenna (described above in connection with FIGS. 1-9) packets are placed into the queue associated with the station until the optimization is finished. When the optimization process is finished, the CAC module sends all of the queued packets to the shared queue 1102 for transmission. The radio card driver 1004 is responsible for transmitting packets from the shared queue 1102 to the radio card 220.

When the wireless device is configured as an access point and has multiple stations associated or registered, the processing of packets to be transmitted by the CAC module is more complicated. The CAC module decides whether to send an incoming packet to the shared queue 1002 or to store it in one of its internal queues 1006 utilizing one or more of the following criteria: current antenna position, the best antenna position for the addressee (station) of the packet, link quality to the addressee in the current antenna position and whether there are packets already queued for other stations. Various examples of the operation of the CAC module will now be provided.

In the case when the CAC module has no packets stored in any of its internal queues 1006, as a packet for a station is received, it is the immediately sent to the shared queue 1002. Additionally as packets are received for a different station which has a signal quality metric that is sufficiently high for the current antenna configuration, those packets would also be immediately transmitted to the shared queue 1002 because the antenna will not be reconfigured for the transmission of those packets. However as packets are received for a station which requires reconfiguration of the antenna system for transmission and when the CAC module has not yet received notification that all of the packets in the shared queue have been transmitted, such incoming packets are stored in a queue associated with that station. Once a packet has been placed in one of the internal queues 1006, all subsequent packets received by the CAC module are placed into queues, with a separate queue being maintained for each addressee (station). This queuing allows the CAC module to keep the order of the packets as close to the sequence in which they are received by the data traffic controller 1006 to minimize the impact on data flow.

Once the CAC module receives notification that all of the packets which it has previously placed in the shared queue 1002 has been transmitted, the CAC module directs the antenna system 202 to the configuration for the station associated with the packets which had been in a queue the longest. Those packets are then transmitted to the shared queue 1002. Additionally packets for stations that can also be transmitted in that same configuration are also transmitted to the shared queue. Once the CAC module receives notification that all of the packets that it has transmitted to the shared queue have been transmitted it then repeats the process for the packets which have been stored in the queue the longest.

Figure 11:
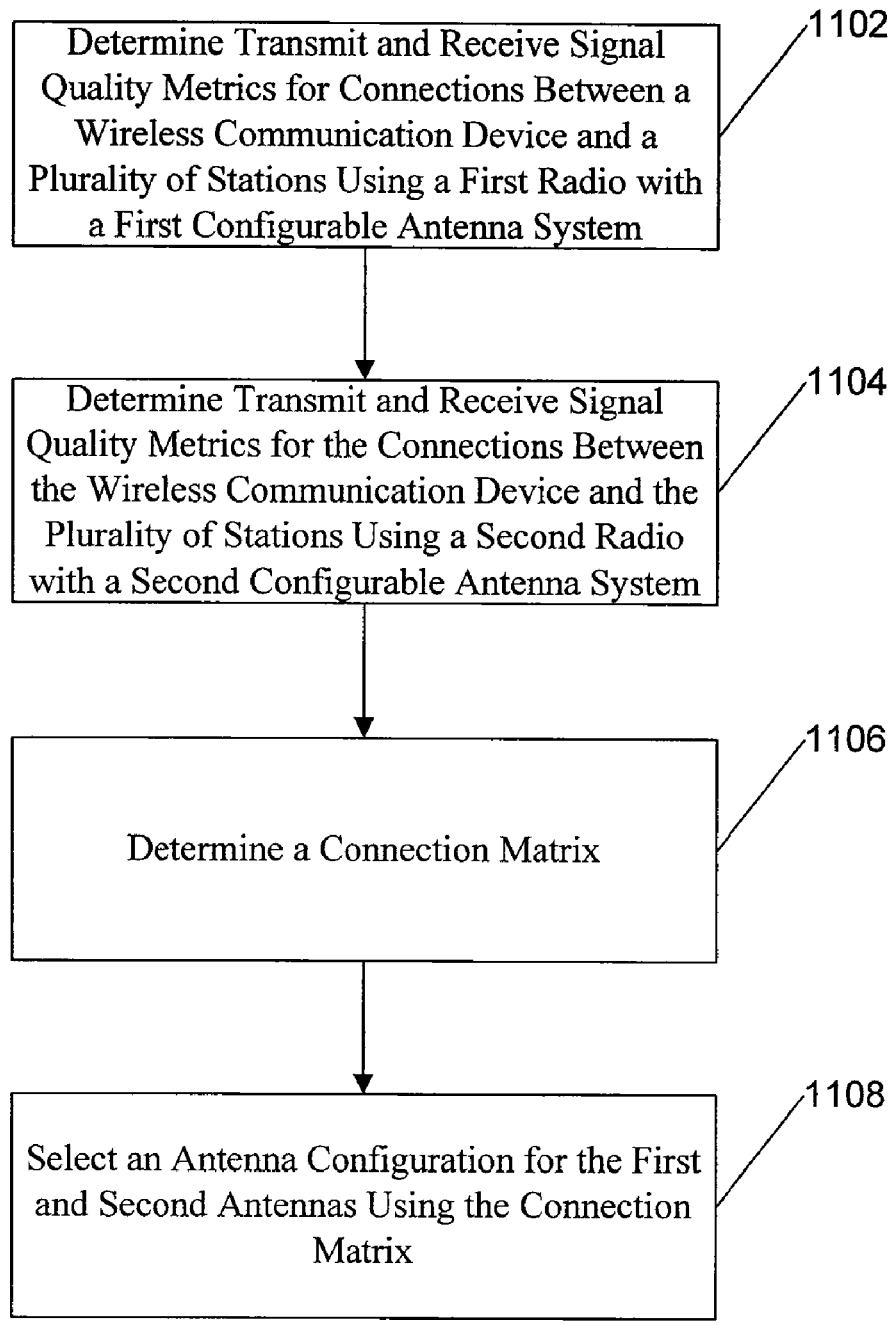
FIG. 11 is a flow chart of an embodiment of operating a wireless communication device.

FIG. 11 is a flow chart of an embodiment of operating a wireless communication device. For example, operating the wireless communication device of FIGS. 1-3 and 8-11. The wireless communication device includes a plurality of radios and a plurality of configurable antenna systems. Flow begins in block 1102 where a plurality of transmit and receive signal quality metrics for connections between a first radio in the wireless communication device and a plurality of stations are determined. The signal quality metrics are determined for the first radio with a first configurable antenna system with the antenna system configured in a plurality of configurations. Flow continues to block 1104 where a plurality of transmit and receive signal quality metrics for connections between a second radio in the wireless communication device and a plurality of stations are determined. The signal quality metrics are determined for second radio with a second configurable antenna system with the antenna system configured in a plurality of configurations.

Flow continues to block 1106 where a connection matrix is determined. The connection matrix includes the transmission and receive signal quality metrics for the first and second radios and the plurality of configurations of the first and second configurable antennas. Flow continues to block 1108 where an antenna configuration for the first and second antennas are selected using the connection matrix.

In one embodiment, the first and second radios can transmit and receive independent data streams to a station. In another embodiment, the first and second radios can transmit the same data stream to a station. In still another embodiment, the first radio can transmit a first data stream to a first station and the second radio transmits a second data stream to a second station simultaneously. In yet another embodiment, the first radio can transmit data to a first station and the second radio receives data for the first station.

The first and second configurable antenna systems can be configured when the wireless communication device is transmitting, or not transmitting. Determining the signal quality metric can include sending a polling request.

In one embodiment, the wireless communication device repeats determining the plurality of transmit and receive signal quality metrics for connections between the wireless communication device and the plurality of stations for the first of the plurality of radios with the first configurable antenna system in the plurality of configurations Repeating determining the plurality of transmit and receive signal quality metrics for connections between the wireless communication device and the plurality of stations for the second of the plurality of radios with the second configurable antenna system in the plurality of configurations. And updates the connection matrix. This repeating, repeating, and updating can be performed at desired intervals, or when it is determined that the signal metrics have changed more that a predetermined amount.

Figure 12:
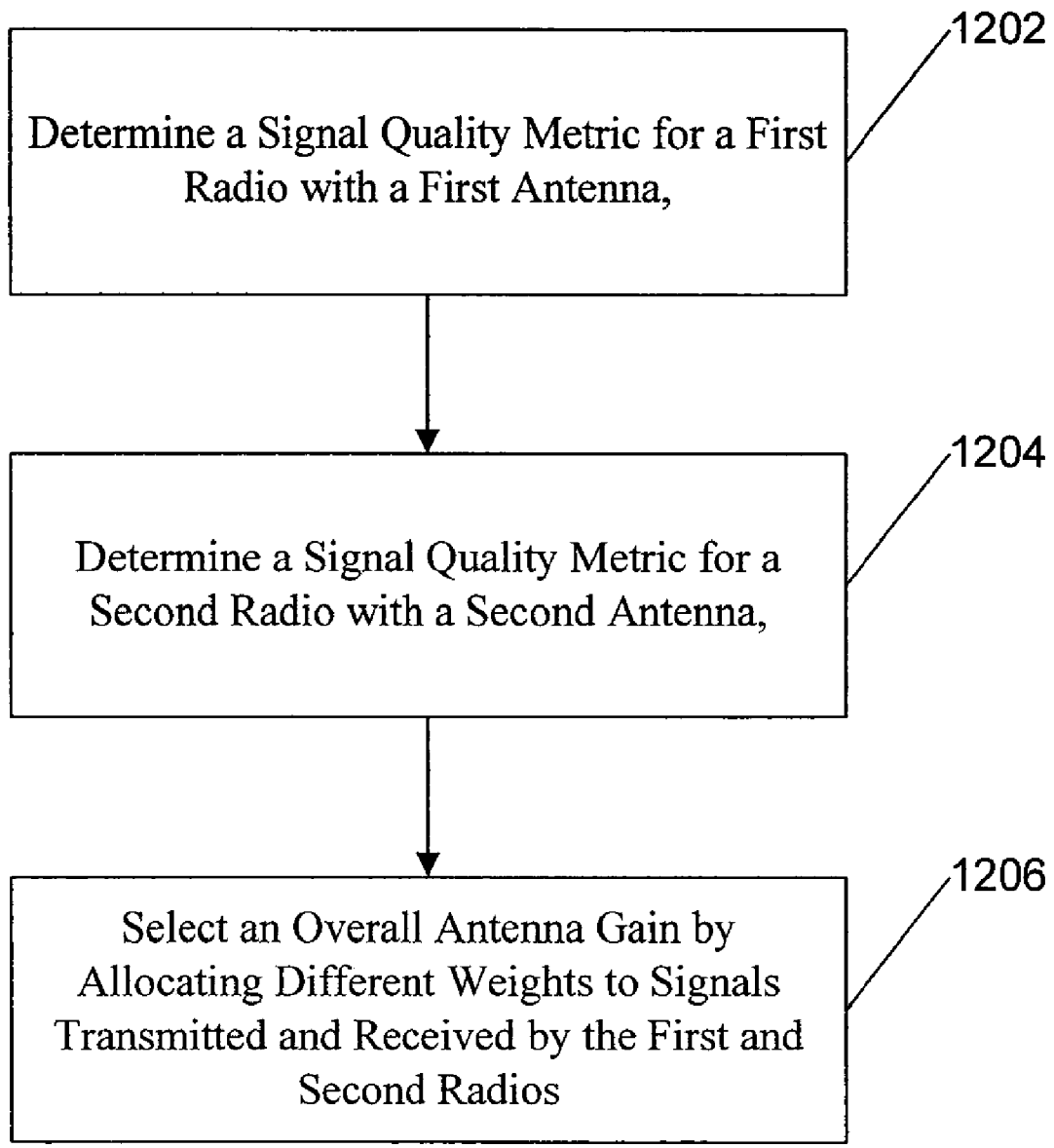
FIG. 12 is a flow chart of an embodiment of operating a wireless communication device.

FIG. 12 is a flow chart of an embodiment of operating a wireless communication device. For example, operating the wireless communication device of FIGS. 1-3 and 8-11. The wireless communication device includes a plurality of radios and a plurality of antennas. Flow begins in block 1202 where a signal quality metric is determined for a first radio with a first antenna. Flow continues to block 1204 where a signal quality metric is determined for a second radio with a second antenna.

Flow continues to block 1206 where an overall antenna gain for the wireless communication device is selected by allocating different weights to signals transmitted and received by the first and second radio.

In one embodiment, the first and second antenna are configurable. In another embodiment, the first and second antennas have a predetermined configuration. The predetermined configuration can include a predetermined directional gain pattern. The predetermined direction gain pattern for the first and second antennas can cover different directions.

In one embodiment, allocating different weights include applying maximum ratio combining to signals received by the radios, or applying weights based on signal quality to signals transmitted by the radios, or other techniques for allocating weights.

In one embodiment, the wireless device is an access point. In another embodiment, wireless device is a station.

Figure 13:
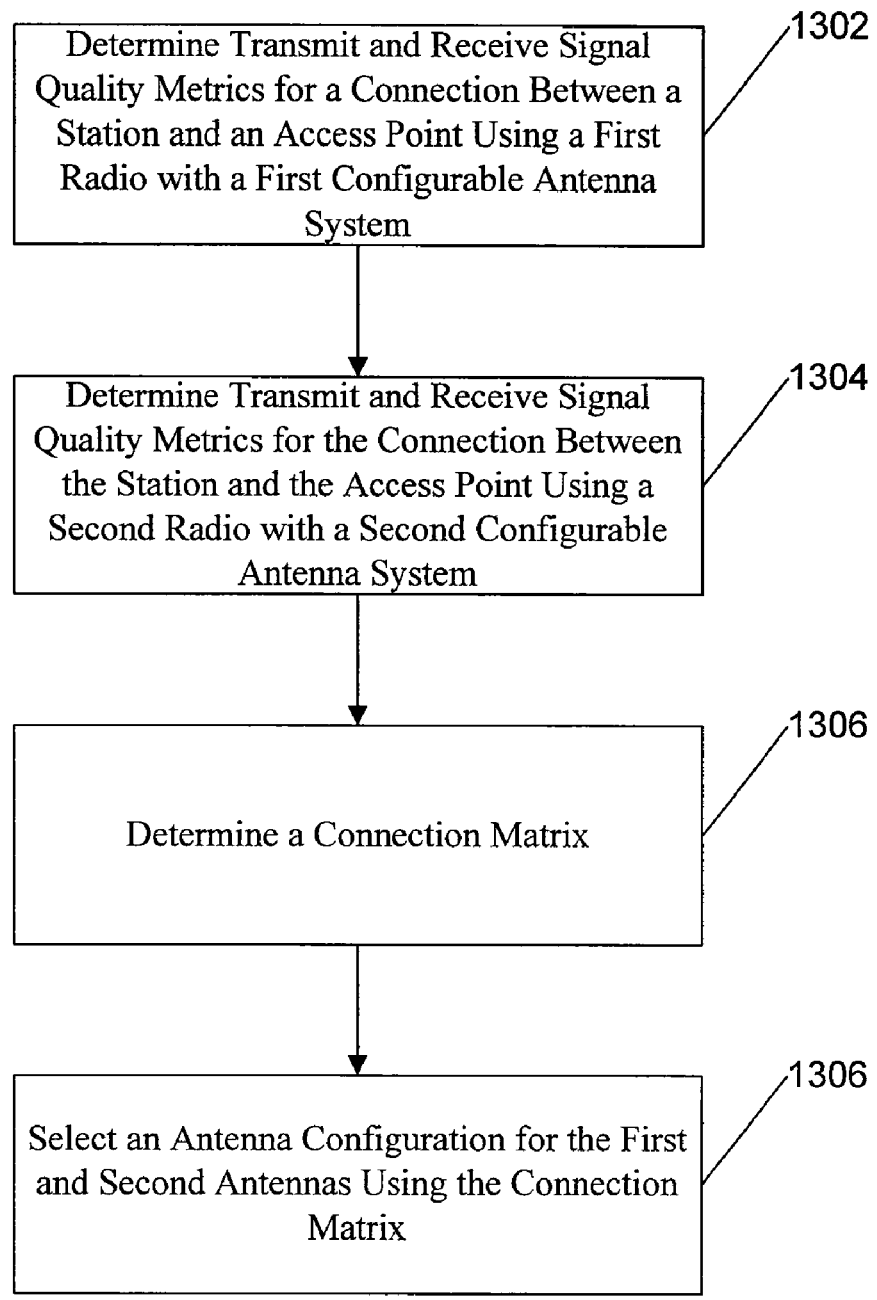
FIG. 13 is a flow chart of an embodiment of operating a station.

FIG. 13 is a flow chart of an embodiment of operating a station. For example, operating the station of FIGS. 1-3 and 8-11. The station includes a plurality of radios and a plurality of configurable antennas. Flow begins in block 1302 where a plurality of transmit and receive signal quality metrics are determined for a connection between the station and an access point for a first radio in the station with a first configurable antenna system in a plurality of configurations. Flow continues to block 1304 where a plurality of transmit and receive signal quality metrics are determined for the connection between the station and the access point for a second radio in the station with a second configurable antenna system in a plurality of configurations.

Flow continues to block 1306 where a connection matrix is determined that includes the transmit and receive signal quality metrics for the first and second radios and the plurality of configurations of the first and second configurable antennas. Flow continues to block 1308 where an antenna configuration for the first and second configurable antennas is selected using the connection matrix.

In one embodiment, the first and second radios transmit and receive independent data streams to the access point. In another embodiment, the first and second radios transmit the same data stream to the access point. Also, determining a transmission signal quality metric comprises receiving a polling request.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method of operating a wireless communication device with a plurality of radios and a plurality of configurable antenna systems, comprising:

determining at a processor of a wireless communication device a plurality of receive signal quality metrics for connections between the wireless communication device and a plurality of stations for a first radio of the plurality of radios with a first configurable antenna system comprising receiving transmissions one at a time from the plurality of stations in a plurality of receive configurations, wherein the receive signal quality metrics are provided by the first radio or a radio controller;

determining at the processor of the wireless communication device a plurality of receive signal quality metrics for connections between the wireless communication device and the plurality of stations for a second radio of the plurality of radios with a second configurable antenna system comprising receiving transmissions one at a time from the plurality of stations in a plurality of configurations, wherein the receive signal quality metrics are provided by the second radio or a radio controller;

determining at the processor of the wireless communication device a connection matrix including the receive signal quality metrics for the first and second radios and the plurality of configurations of the first and second configurable antennas; and selecting at an antenna control module of the processor an antenna configuration for the first and second antenna configurations using the connection matrix such that the wireless communication device can always receive transmissions from all of a plurality of stations of a network, the wireless communication device can deliver maximum antenna strength for both uplink an downlink, and the overhead incurred by the wireless communication device in processing the calculation is minimized.

2. The method of claim 1, wherein the first and second radios transmit and receive independent data streams to a station.

3. The method of claim 1, wherein the first and second radios transmit the same data stream to a station.

4. The method of claim 1, wherein the first radio transmits a first data stream to a first station and the second radio transmits a second data stream to a second station simultaneously.

5. The method of claim 1, wherein the first radio transmits data to a first station and the second radio receives data from the first station.

6. The method of claim 1, further comprising configuring the first and second configurable antenna systems when the wireless communication device is not transmitting.

7. The method of claim 1 further comprising configuring the first and second configurable antenna system when the wireless communication device is transmitting.

8. The method of claim 1 wherein determining the signal quality metric comprises sending a polling request.

9. The method of claim 1, further comprising:
 repeating determining the plurality of transmit and receive signal quality metrics for connections between the wireless communication device and the plurality of stations for the first of the plurality of radios with the first configurable antenna system in the plurality of configurations;
 repeating determining the plurality of transmit and receive signal quality metrics for connections between the wireless communication device and the plurality of stations for the second of the plurality of radios with the second configurable antenna system in the plurality of configurations; and
 updating the connection matrix.

10. A method of operating a wireless device with a plurality of radios and a plurality of antennas, comprising:
 determining at a processor of a wireless communication device a signal quality metric for a first radio with a first antenna for a connection with a station wherein the signal quality metric is provided by the first radio or a radio controller;
 determining at the processor of the wireless communication device a signal quality metric for the first radio with a second antenna for the connection with the station wherein the signal quality metric is provided by the first radio or the radio controller;
 determining at the processor of the wireless communication device a signal quality metric for a second radio with a third antenna for the connection with the station wherein the signal quality metric is provided by the second radio or the radio controller;
 determining at the processor of the wireless communication device a signal quality metric for the second radio with a fourth antenna for the connection with the station wherein the signal quality metric is provided by the second radio or the radio controller;
 selecting at an antenna control module of the processor an antenna for use with the first radio based upon the determined signal quality metrics;
 selecting at an antenna control module of the processor an antenna for use with the second radio based upon the determined signal quality metrics; and
 selecting an overall antenna gain for the wireless communication device for the connection with the station by allocating different weights to signals transmitted and received by the first and second radios using the selected antennas such that the wireless communication device can always receive transmissions from all of a plurality of stations of a network, the wireless communication device can deliver maximum antenna strength for both uplink an downlink, and the overhead incurred by the wireless communication device in processing the calculation is minimized.

11. The method of claim 10, wherein the first and second antenna are configurable.

12. The method of claim 10, wherein the first and second antennas have a predetermined configuration.

13. The method of claim 12, wherein the predetermined configuration comprises a predetermined directional gain pattern.

14. The method of claim 13, wherein the predetermined direction gain pattern for the first and second antennas cover different directions.

15. The method of claim 10, wherein allocating different weights comprises applying maximum ratio combining to signals received by the radios.

16. The method of claim 10, wherein allocating different weights comprises applying weights based on signal quality to signals transmitted by the radios.

17. The method of claim 10, wherein the wireless device is an access point.

18. The method of claim 10, wherein the wireless device is a station.

19. A method of operating a station with a plurality of radios and a plurality of configurable antenna systems, comprising:
 determining a plurality of transmit and receive signal quality metrics for a connection between the station and an access point for a first radio in the station with a first configurable antenna system, comprising receiving transmissions from the access point while the first configurable antenna system is in a plurality of configurations;
 determining a plurality of transmit and receive signal quality metrics for the connection between the station and the access point for a second radio in the station with a second configurable antenna system, comprising receiving transmissions from the access point while the second configurable antenna system is in a plurality of configurations;
 determining a connection matrix including the transmission and receive signal quality metrics for the first and second radios and the plurality of configurations of the first and second configurable antennas; and
 selecting an antenna configuration for the first and second antenna configurations using the connection matrix such that the access point can always receive transmissions from all of a plurality of stations of a network, the access point can deliver maximum antenna strength for both uplink an downlink, and the overhead incurred by the access point in processing the calculation is minimized.

20. The method of claim 19, wherein the first and second radios transmit and receive independent data streams to the access point.

21. The method of claim 19, wherein the first and second radios transmit the same data stream to the access point.

22. The method of claim 19, wherein determining a transmission signal quality metric comprises receiving a polling request.

23. An access point comprising:
 a plurality of radios and a plurality of configurable antenna systems;

a processor that determines a plurality of transmit and receive signal quality metrics for connections between the access point and a plurality of stations for a first of the plurality of radios, wherein determining receive signal quality metrics includes receiving transmissions one at a time from the plurality of stations with a first configurable antenna system in a plurality of configurations;

the processor determines a plurality of transmit and receive signal quality metrics for connections between the access point and the plurality of stations for a second of the plurality of radios, wherein determining receive signal quality metrics includes receiving transmissions one at a time from the plurality of stations with a second configurable antenna system in a plurality of configurations;

the processor determines a connection matrix that includes the transmit and receive signal quality metrics for the first and second radios and the plurality of configurations of the first and second configurable antennas;

a memory that stores the connection matrix; and an antenna control module that selects an antenna configuration for the first and second antenna configurations based on the connection matrix;

wherein the access point can always receive transmissions from all of a plurality of stations of a network, the access point can deliver maximum antenna strength for both uplink an downlink, and the overhead incurred by the access point in processing the calculation is minimized.

* * * * *